US010179289B2

(12) United States Patent
Stirling

(10) Patent No.: US 10,179,289 B2
(45) Date of Patent: Jan. 15, 2019

(54) SYSTEM AND METHOD FOR READING GRAPHICALLY-ENCODED IDENTIFIERS FROM PHYSICAL TRADING CARDS THROUGH IMAGE-BASED TEMPLATE MATCHING

(71) Applicant: ACTIVISION PUBLISHING, INC., Santa Monica, CA (US)

(72) Inventor: Spencer D. Stirling, Thornton, CO (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 153 days.

(21) Appl. No.: 15/188,570

(22) Filed: Jun. 21, 2016

(65) Prior Publication Data

US 2017/0361233 A1    Dec. 21, 2017

(51) Int. Cl.
    *A63F 13/70*    (2014.01)
    *G06T 11/60*    (2006.01)
    *G06T 3/40*     (2006.01)

(52) U.S. Cl.
    CPC ............... *A63F 13/70* (2014.09); *G06T 3/40* (2013.01); *G06T 11/60* (2013.01); *G06T 2207/20132* (2013.01)

(58) Field of Classification Search
    None
    See application file for complete search history.

(56) References Cited

U.S. PATENT DOCUMENTS

| | | | |
|---|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,762,552 A | 6/1998 | Vuong |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Office Action dated Feb. 26, 2018 for U.S. Appl. No. 14/883,115; (pp. 1-13).

(Continued)

*Primary Examiner* — Jason Yen
(74) *Attorney, Agent, or Firm* — Novel IP

(57) ABSTRACT

A system and method is provided for reading graphically-encoded identifiers from physical trading cards through image-based template matching in order to incorporate game items from the identified trading cards in a video game.

21 Claims, 15 Drawing Sheets

(56) References Cited

U.S. PATENT DOCUMENTS

| | | |
|---|---|---|
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,179,713 B1 | 1/2001 | James |
| 6,185,614 B1 | 2/2001 | Cuomo |
| 6,200,216 B1 | 3/2001 | Peppel |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,509,925 B1 | 1/2003 | Dermler |
| 6,525,731 B1 | 2/2003 | Suits |
| 6,546,400 B1 | 4/2003 | Aberson |
| 6,549,933 B1 | 4/2003 | Barrett |
| 6,567,109 B1 | 5/2003 | Todd |
| 6,567,813 B1 | 5/2003 | Zhu |
| 6,612,501 B1 | 9/2003 | Woll |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,709,336 B2 | 3/2004 | Siegel |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,314,407 B1 | 1/2008 | Pearson |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,502,759 B2 | 3/2009 | Hannigan |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |

(56) References Cited

U.S. PATENT DOCUMENTS

| | | |
|---|---|---|
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,509,680 B2 | 8/2013 | Atsmon |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,615,471 B2 | 12/2013 | Hannigan |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2002/0028710 A1* | 3/2002 | Ishihara .................. A63F 13/02 463/44 |
| 2004/0014514 A1 | 1/2004 | Yacenda |
| 2004/0228291 A1 | 11/2004 | Huslak |
| 2005/0182693 A1 | 8/2005 | Alivandi |
| 2006/0038833 A1 | 2/2006 | Mallinson |
| 2006/0068860 A1* | 3/2006 | Ueshima .................. A63F 13/10 463/1 |
| 2007/0232399 A1 | 10/2007 | Kathman |
| 2007/0233558 A1 | 10/2007 | Jones |
| 2008/0102910 A1 | 5/2008 | Peppel |
| 2008/0200226 A1* | 8/2008 | Ichimura .................. A63F 13/10 463/8 |
| 2008/0284101 A1* | 11/2008 | Marx ....................... A63F 1/00 273/292 |
| 2008/0305874 A1* | 12/2008 | Wilm ....................... A63F 13/10 463/42 |
| 2009/0011837 A1* | 1/2009 | Marans ..................... A63F 1/00 463/43 |
| 2009/0051114 A1 | 2/2009 | Robbers |
| 2009/0054124 A1 | 2/2009 | Robbers |
| 2009/0113448 A1 | 4/2009 | Smith |
| 2009/0215512 A1 | 8/2009 | Gannon |
| 2010/0017890 A1 | 1/2010 | Tucker |
| 2010/0029380 A1 | 2/2010 | Rhoads |
| 2010/0062819 A1 | 3/2010 | Hannigan |
| 2011/0014982 A1 | 1/2011 | Hiraishi |
| 2011/0045893 A1* | 2/2011 | Hiraro ..................... A63F 13/45 463/25 |
| 2011/0305367 A1 | 12/2011 | Osako |
| 2012/0205436 A1 | 8/2012 | Thomas |
| 2012/0244939 A1 | 9/2012 | Braun |
| 2012/0252577 A1* | 10/2012 | Webster .................. A63F 13/92 463/31 |
| 2013/0207373 A1 | 8/2013 | Lucas-Woodley |
| 2014/0100025 A1* | 4/2014 | Ackley ..................... A63F 1/14 463/29 |
| 2014/0114630 A1 | 4/2014 | Brave |

(56) References Cited

U.S. PATENT DOCUMENTS

| | | |
|---|---|---|
| 2014/0344725 A1 | 11/2014 | Bates |
| 2015/0023602 A1 | 1/2015 | Wnuk |
| 2015/0102098 A1 | 4/2015 | Adams |
| 2015/0196832 A1 | 7/2015 | Schroeder |
| 2015/0228148 A1 | 8/2015 | Barnes |
| 2015/0348329 A1 | 12/2015 | Carre |
| 2016/0191671 A1 | 6/2016 | Dawson |
| 2016/0287998 A1 | 10/2016 | Kawanabe |
| 2017/0361233 A1 | 12/2017 | Stirling |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 0203645 A2 | 1/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Supplementary European Search from the European Patent Office for EP05723458.5, dated Jul. 19, 2010.
International Search Report as Published as WO2005/079538 in corresponding international application No. PCT/US2005/005550. dated Jul. 5, 2006.
Notice of Allowance dated May 24, 2018 for U.S. Appl. No. 14/883,171 (pp. 1-7).
Office Action dated Jun. 5, 2018 for U.S. Appl. No. 14/883,154 (pp. 1-20).

* cited by examiner

SYSTEM AND METHOD FOR READING GRAPHICALLY-ENCODED IDENTIFIERS FROM PHYSICAL TRADING CARDS THROUGH IMAGE-BASED TEMPLATE MATCHING

FIELD OF THE INVENTION

The invention relates generally to video games, and more particularly to a system and method for reading graphically-encoded identifiers from physical trading cards through image-based template matching in order to incorporate game items from the identified trading cards in a video game.

BACKGROUND OF THE INVENTION

Various video games exist wherein game features and functionality are "unlocked" (or otherwise accessed) via visible codes obtained from physical trading cards distributed for use with the video game.

For example, trading cards may depict a game item (e.g., a character, accessory, etc.) along with an access code (e.g., a serial number or other code) that a user must input in order to activate the game item for use and enjoyment during gameplay. In some instances, the access code may comprise a string of numbers and/or letters that have to be manually entered by the user. Other games, by contrast, encode access codes or other identifiers in bar codes (including QR codes, etc.) that must be scanned in order to extract the code and activate the game item. In either instance, the presence of numbers/letters and/or bar codes on the surface of a trading card may diminish the aesthetic appearance of the trading card.

To address these and other drawbacks associated with the use of such codes or identifiers on physical trading cards, a system has been created wherein graphical representations of unique codes are included as aspects of the trading cards (e.g., integrated into the design of the physical trading cards). For example, a system and method for creating trading cards for use with a video game and integrating associated unique codes as part of the content of trading cards is described in U.S. patent application Ser. No. 14/883,115, filed on Oct. 14, 2015, the disclosure of which is hereby incorporated by reference herein in its entirety. A system and method for facilitating the printing of such cards is described in U.S. patent application Ser. No. 14/883,154, filed on Oct. 14, 2015, the disclosure of which is hereby incorporated by reference herein in its entirety. A system and method for detecting and validating a trading card for use with a video game is described in U.S. patent application Ser. No. 14/883,171, filed on Oct. 14, 2015, the disclosure of which is hereby incorporated by reference herein in its entirety.

In certain instances, difficulties may arise when attempting to read (or detect) a code that has been graphically encoded on a physical trading card. For example, some trading cards may have a glossy (or other) finish that makes it challenging to detect graphically encoded identifiers. Further, for some trading cards, a character or other design feature depicted on a trading card may "bleed" or blend into (or otherwise overlap with) the aspect of the card (e.g., a border of the card) that includes the graphically encoded identifier, making detection difficult. Additionally, various imaging devices used to capture an image of a trading card may vary in size/scale, resolution, rotation, perspective, etc., raising additional challenges. Still other difficulties may arise when/if a user obscures part of a trading card with his or her fingers when holding the card up to an imaging device, or tries to image the card in dark lighting (low contrast).

These and other drawbacks may lead to user frustration if multiple attempts are needed to successfully read (or detect) a code that has been graphically encoded on a physical trading card.

SUMMARY OF THE INVENTION

The invention addressing these and other drawbacks relates to a system and method for reading graphically-encoded identifiers from physical trading cards through image-based template matching in order to incorporate game items from the identified trading cards in a video game.

According to an aspect of the invention, the system may obtain and store image excerpts of actual physical trading cards at the time of creation (or at another time). Each image excerpt may include an actual portion of an image of a trading card (e.g., obtained from an actual image of the entire trading card such as by cropping, or may be generated as a portion that is to be digitally assembled with other portions to form an actual image of the entire trading card), or a rendition of a portion of the trading card (e.g., not a portion of an actual trading card), as long as the image excerpt may be used for comparison and matching with actual images of trading cards.

In some implementations, a given image excerpt may be stored as a control point template, which may comprise an image of a particular portion of a trading card. The location may, for example, comprise a "top-left corner" portion, a "top-right corner" portion, a "bottom-left corner" portion, a "bottom-right corner" portion, and/or other portion of the trading card (in which directional descriptions relate to a card being held in an upright (or other) position relative to the ground or other frame of reference). The system may store a given control point template in association with a particular position on a trading card.

A control point template may be used to determine a position of an image of a trading card within an image frame. For example, if a "top-left corner" control point template matches (through image processing comparisons of a control point template and an image of a trading card in an image frame), the matching areas of the image frame may be determined to correspond to the top-left corner of the trading card, which may assist in locating and/or orientating an image of the trading card in an image frame.

In some implementations, a given image excerpt may be stored as a graphical encoding template, which is an image of a graphical encoding indicator that graphically encodes a value. The encoded value may include, without limitation, a binary value (such as an "on" value that encodes the numeral one, and an "off" value that encodes the numeral zero). Each graphical encoding template may be stored in association with its corresponding value. For example, an identifier for an "on" graphical encoding template (and/or the "on" graphical encoding template itself) may be stored in association with its corresponding value in a card management database.

In one implementation, a trading card may include one or more graphical identification regions that include a plurality of graphical encoding indicators, each indicator encoding either an "on" value or an "off" value based on a unique graphical characteristic (e.g., shape, color, size, etc.). These graphical encoding indicators may be integrated within a design of the trading card and may be read based on image comparisons with graphical encoding templates that are each associated with an "on" or "off" value, permitting various types of distinguishable sets of graphical encoding indicators (e.g., having various shapes, colors, sizes, etc.) to be used to encode a value. This is unlike a bar code or similar coding that is conspicuous and not integrated within a design, and has indicators (e.g., black lines) whose relative widths are used to decode the bar code without image comparisons to templates. Comparison of each of the plurality of graphical encoding indicators to the "on" template and the "off" template allows the system to decode the graphical encoding indicators into "on" or "off" values. Although binary values are described as various examples of encoded values, other types of values (e.g., non-binary values) may be used as well.

In one implementation, the system may add a control point template of a trading card to a card management database that includes image excerpts of actual trading cards used to position trading cards in an image frame. Each control point template may comprise only a portion of a trading card. The system may additionally or alternatively add a graphical encoding template to the card management database. As such, a trading card that has been or will be printed, and has not yet been input into the system, may be added as appropriate, allowing the system to scale to accept different types of trading cards, as well as different types of graphical encoding schemes.

When building a database of control point templates, one goal is to add control point templates that are common to all trading cards in order to minimize the amount of downstream processing necessary to position a given trading card using the control point templates. However, because a given trading card may be unique relative to other trading cards, it is likely (given a sufficient number of trading cards known by the system) that two trading cards will not share a common set of image features at a particular location (e.g., top-left corner). In these instances, at least two control point templates may be stored and recognized for that particular location (e.g., at least two top-left corner templates).

In operation, a physical trading card may be imaged by a device, such as a user device equipped with a camera or other imaging device. The system may receive an image stream and provide the image stream as an input to a computer vision engine, which may account for any perspective skew, or other imaging artifacts, so that the image of the physical trading card is adjusted accordingly.

In some implementations, the computer vision engine may provide as output one or more image frames. Each image frame may include an image of the physical trading card, which may be adjusted for perspective skew, at a corresponding moment in time. In many instances, due to technical limitations, the computer vision engine may be unable to locate the image of the physical trading card within an image frame with sufficient precision to enable identification of the physical trading card. These technical limitations may result from, for example, an inability to distinguish a boundary of the trading card due to imaging conditions (e.g., lighting, shadowing, contrast, clarity, etc.). As a result, the computer vision engine may provide only a course (or no) estimation of the boundaries of the image of the trading card within an image frame. As such, one or more image frames provided by the computer vision engine may need to be further analyzed in order to locate the image of the physical trading card within an image frame.

The system may obtain one or more image frames as output of the computer vision engine. To identify a trading card that is imaged in an image frame, the system may locate an image of the trading card within the image frame. Once the image of the trading card is located within the image frame, the system may identify (e.g., locate) and read the card identification region(s) based on the image of the trading card. To improve the accuracy of reads, the system may process multiple image frames. In some implementations, the system may respond to inconclusive reads in various ways, and perform bias correction to account for any bias introduced by image processing.

As previously noted, because of technical limitations, the computer vision engine may be unable to locate an image of a trading card (e.g., a boundary of the trading card) in an image frame. The system may therefore determine the location of the trading card image in the image frame. To do so, the system may obtain a control point template. For example, the control point template may be obtained from a database of control point templates (e.g., the card management database) that was previously generated from excerpts of images of actual physical trading cards known to the system. As previously noted, each control point template may correspond to a particular portion of an actual physical trading card, and is associated with a location on the trading card from which the control point template was derived.

The system may compare the control point template with the image frame. Such comparison may use template matching techniques. In template matching, portions of an image, such as portions of the image frame, may be continuously sampled along a window to determine whether a match to a template, such as a control point template, occurs. The window may define a size of the portions of the image to sample at a given time. An output of the template matching may include match scores, which may be output as each window is sampled. In some instances, the match score may have a decimal value that ranges between 0 and 1, in which a match score of 1 represents the highest confidence in a match and a match score of 0 represents the lowest confidence in a match. Other types of match scores and/or match score ranges may be utilized.

The system may identify a location of the physical trading card image within the image frame based on matches between one or more control point templates and portions (e.g., windows) of the image frame. In some instances, the system may require that a threshold number of control point templates must match in order to accurately locate the physical trading card image within the image frame. If the threshold number of matches is not achieved, the system may determine that the physical trading card image with the image frame is not possible and may discard the image frame (and, in some instances, use a next image frame for processing). This may occur when, for example, an image frame corresponds to a moment in time at which the physical trading card was imaged under poor imaging conditions.

If a threshold number of matches has been achieved, the system may fine-tune the location of the trading card within the image frame based on further image processing such as, for example, using an Affine Transformation.

When a location of an image of the physical trading card within an image frame has been determined, the system may locate and read a card identification region to identify the trading card being imaged. For example, the system may locate one or more card identification regions based on the location of the image within the image frame, because the card identification region may be located at known locations of a physical trading card.

The system may obtain a graphical encoding template. For example, the graphical encoding template may be obtained from a database of graphical encoding templates (e.g., card management database) that was previously generated based on the encoding scheme used by trading cards processed by the system. As previously noted, each graphical encoding template may be associated with a particular value (e.g., a binary or other value) such that a match with a graphical encoding template means that a corresponding value associated the graphical encoding template has been decoded at a matching position of the card identification region.

The system may compare the graphical encoding template and the card identification region. In particular, the system may use template matching between the graphical encoding template and the image frame at the location of the card identification region (e.g., using template matching techniques to compare the graphical encoding template to the card identification region).

The system may read results of the template matching as the windows are continuously sampled. Each window may correspond to a slot, or position of a card identification region that corresponds to a graphical encoding indicator. For a given window's match score output by template matching, if the match score exceeds a predefined graphical encoding threshold value, then a match to the graphical encoding template may be deemed to occur at a slot corresponding to the window. In this case, the system may record the value and/or match score in association with the slot position in a memory buffer used for template matching. The system may increment the slot position and move on to the next window to be matched. If the match score does not exceed the predefined graphical encoding threshold value, the system may deem the matching to be inconclusive for that particular slot for that particular value. In these instances, the system may record the match score and/or an indication of inconclusiveness in association with the slot position in the memory buffer. The system may repeat the foregoing matching for each graphical encoding template in order to determine whether or not a given slot encodes a value associated with each graphical encoding template.

In some implementations, to improve the accuracy of reading graphical encoding indicators, the system may employ multiple passes, with each pass corresponding to processing an image frame. The system may repeat the foregoing imaging processing operations of locating an imaging of a physical trading card within an image frame, and reading a card identification region for multiple image frames (such as those output by the computer vision engine).

In some implementations, to account for inconclusive reads, the system may produce an error message indicating that a misread occurred. In these implementations, the user may be prompted to try imaging the trading card at a different location (e.g., with better or otherwise different lighting) or using a different perspective.

Alternatively or additionally, in some implementations, to account for inconclusive reads, the system may repeat one or more of the processing operations to, for example, achieve agreement for a given slot position across different image frames.

In an implementation, template matching may introduce certain biases when matching a graphical encoding template against a window of an image frame (where the window includes an expected location of a card identification region of a trading card imaged in the image frame). For example, template matching may be biased toward certain encoded values being read over others. In a particular example, through empirical data, it may be observed that template matching tends to read an "off" value more times than an actual "off" value should have been read. This may result because certain graphical encoding indicators may be printed (or designed) in a manner that computer image processing systems (such as template matching) misrecognize such graphical encoding indicators. In another example, it may be observed that template matching tends to read an "off" value less times than an actual off value should have been read. In some implementations, the system may account for these biases by using a bias correction parameter that adjusts for and corrects the bias.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for uniquely identifying physical trading cards, and for incorporating game items from identified trading cards in a video game.

Exemplary System Architecture

Figure 1:
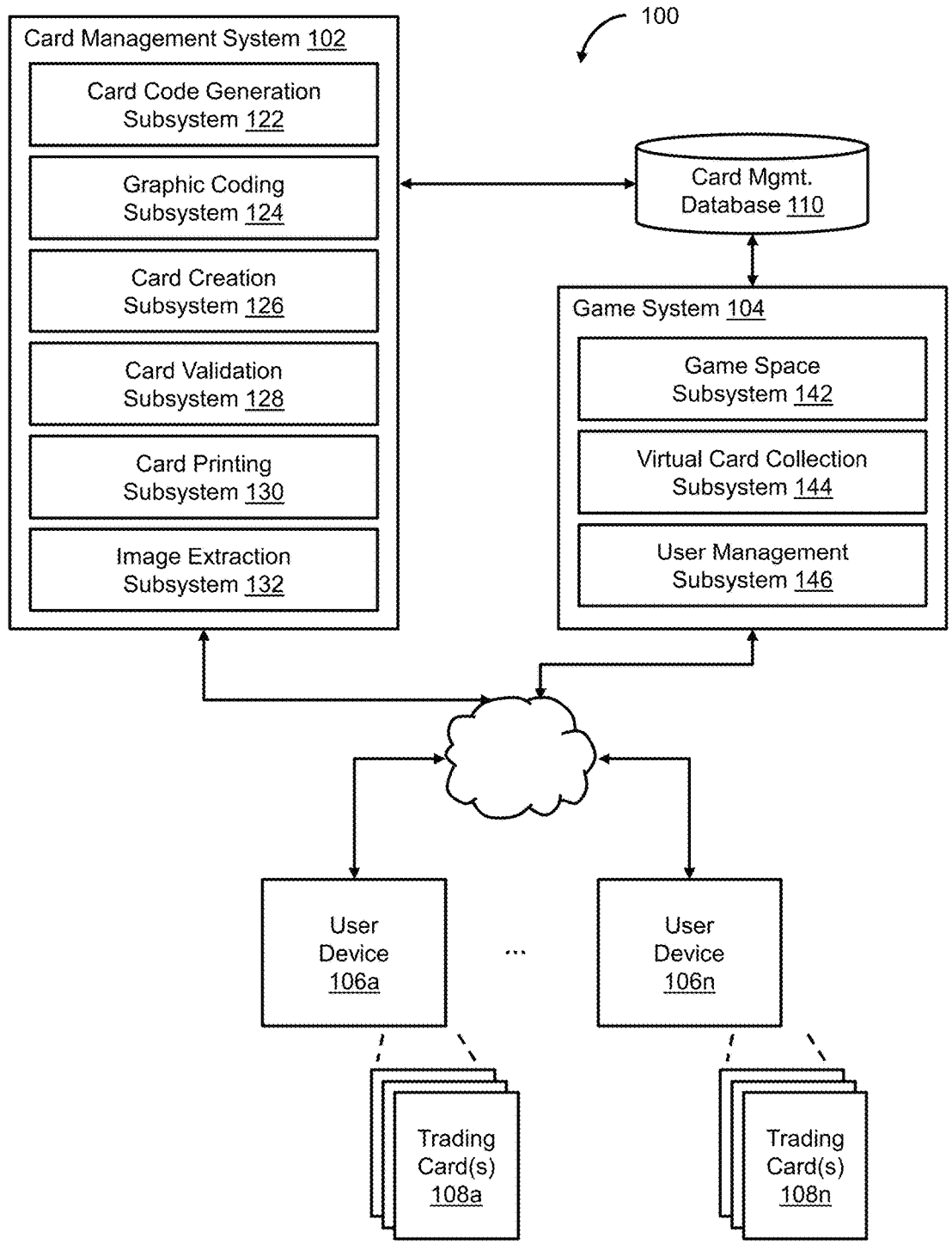
FIG. 1 illustrates an exemplary system for uniquely identifying physical trading cards, and for incorporating game items from identified trading cards in a video game, according to an implementation of the invention.

FIG. 1 illustrates an exemplary system 100 for uniquely identifying physical trading cards, and for incorporating game items from identified trading cards in a video game, according to an implementation of the invention.

As shown, system 100 may comprise a card management system 102, a game system 104, one or more user devices 106, one or more trading cards 108, a card management database 110, or other components.

Card Management System 102

Card management system 102 may comprise one or more servers that include one or more of a card code generation subsystem 122, a graphic coding subsystem 124, a card creation subsystem 126, a card validation subsystem 128, a card printing subsystem 130, an image extraction subsystem 132, or other components.

Game System 104

Game system 104 may comprise one or more servers that include one or more of a game space subsystem 142, a virtual card collection subsystem 144, a user management subsystem 146, or other components.

In one implementation, game system 104 may comprise a proprietary gameplay network system, such as, without limitation, Microsoft's Xbox LIVE®, Sony's PlayStation Network®, gameplay networks provided by Apple, Google, and Amazon, and/or another type of gameplay network system. In this implementation, a given game system 104 may be associated with a particular type of gaming console. Other types of game systems 104 using other types of gameplay networks may be used as well.

User Devices 106a-106n

User device 106 may comprise any type of mobile terminal, fixed terminal, or other device. As an example, user device 106 may comprise a gaming console, a handheld gaming device, a personal computer (e.g., a desktop computer, a laptop computer, etc.), a smartphone, a tablet computing device, and/or other device that can be used to interact with an instance of a video game. Users may, for instance, utilize one or more user devices 106 to interact with card management system 102, game system 104, or other components of system 100.

User device 106 may additionally include a camera, a scanner, or other input device that may be used to capture an input scene (e.g., one or more trading cards or other items).

User device 106 may further include a virtual reality or augmented reality device that may be used to capture an input scene and further augment the input scene with computer-generator sensory input.

Trading Cards 108a-108n

According to an aspect of the invention, trading card 108 may comprise a physical card (e.g., made out of paperboard, thick paper, plastic, metal, or other materials) that corresponds to one or more game items. Non-limiting examples of game items include, for instance, virtual trading cards (e.g., virtual representations of a trading card used within a video game), video game characters, in-game accessories for use by a character (e.g., weapons, spells, portions, vehicles, etc.), special powers (e.g., invisibility, a flying ability, characteristic/ability upgrades, etc.) available to a character in the game, or other game items. Other types of trading cards may be used as well.

It should be noted that, although implementations described herein are with respect to trading cards, it is understood that (to the extent possible) other objects may be used in place of trading cards in other implementations. Non-limiting examples of other objects that may be used in place of trading cards include, for instance, figurines (e.g., action figures or other figurines), figurine accessories, real-world items that correspond to game items, or other objects.

Card Management Database 110

According to an aspect of the invention, card management database 110 may be, include, or interface to, for example, one or more of an Oracle™ relational database sold commercially by Oracle Corporation. Other databases, such as Informix™, DB2 (Database 2), NoSQL databases including Hadoop™ or Cassandra™, or other data storage, including file-based, or query formats, platforms, or resources such as OLAP (On Line Analytical Processing), SQL (Structured Query Language), a SAN (storage area network), Microsoft Access™, or others may also be used, incorporated, or accessed. Card management database 110 may comprise one or more such databases that reside in one or more physical devices and in one or more physical locations. The database may store a plurality of types of data and/or files and associated data or file descriptions, administrative information, or any other data.

General System Configuration

It should be noted that while one or more operations are described herein as being performed by components of card management system 102 or game system 104, those operations may, in some implementations, be performed by components of user device 106.

In some implementations, the various computers and subsystems illustrated in FIG. 1 may comprise one or more computing devices that are programmed to perform the functions described herein. The computing devices may include one or more electronic storages (e.g., card management database 110 or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers, or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 122-132, 142-146, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 122-132 or 142-146 described herein is for illustrative purposes, and is not intended to be limiting, as any of subsystems 122-132 or 142-146 may provide more or less functionality than is described. For example, one or more of subsystems 122-132 or 142-146 may be eliminated, and some or all of its functionality may be provided by other ones of subsystems 122-132 or 142-146. As another example, additional subsystems may be programmed to perform some or all of the functionality attributed herein to one of subsystems 122-132 or 142-146.

The foregoing system architecture is exemplary only and should not be viewed as limiting. Other system configurations may be used as well, as would be appreciated by those having skill in the art. Attention will now be turned to a more detailed description of various implementations of the invention. It should be noted that features described herein may be implemented separately or in combination with one another.

Card Creation

According to an aspect of the invention, one or more physical trading cards may be created for use with any type of video game (e.g., virtual trading card games, action-adventure games, racing games, first-person-shooter games, and the like). Each trading card may depict at least one game item that may be "unlocked," activated, or otherwise made available for use by a player during gameplay.

As previously noted, examples of game items may include, without limitation, virtual trading cards (i.e., virtual representations of a trading card used within a video game), video game characters, in-game accessories for use by a character (e.g., weapons, spells, portions, vehicles, etc.), special powers (e.g., invisibility, a flying ability, characteristic/ability upgrades, etc.) available to a character in the game, or other game items.

Card Code Generation Subsystem 122

In an implementation, card code generation subsystem 122 may generate one or more unique codes for identifying one or more trading cards. A unique code may comprise a serial number, an alphanumeric code, a set of characters (e.g., numbers, letters, special characters, etc.), or other code or unique identifier.

In one implementation, each trading card may have its own unique code, even if it depicts the same game item as other trading cards. As an example, for a given fantasy game, even though a predetermined number of physical trading cards may be distributed depicting the same "wizard" character, each trading card will have its own unique code.

According to an aspect of the invention, card code generation subsystem 122 may utilize a random number generator (or other algorithm) to generate unique serial numbers for identifying individual trading cards. Each of the unique serial numbers may be randomly selected by the random number generator from numbers within one or more ranges (e.g., default number ranges, user-defined number ranges, etc.). In one use case, the range(s) of numbers (from which the unique serial numbers are randomly selected) may comprise a number space that is significantly greater than the number of unique serial numbers to be generated for identifying the trading cards (e.g., the number space utilized by the random number generated may be significantly greater than the predefined number of trading cards that are to be printed and/or distributed to consumers). In this regard, users cannot easily guess the unique serial numbers (or other unique codes) associated with the trading cards. While the foregoing example describes the use of a random number generator to generate unique serial numbers, any type of algorithm or numbering system may be used for the generation of unique serial numbers. Other techniques for preventing successful reverse engineering of the unique serial numbers are described elsewhere herein.

Graphic Coding Subsystem 124

Upon generation of one or more unique codes, graphic coding subsystem 124 may generate one or more graphic representations of the unique codes based on a graphic coding scheme (e.g., a graphic encoding scheme).

Card Creation Subsystem 126

Card creation subsystem 126 may utilize the graphical representations of the unique codes to generate the trading cards associated with the unique codes. The trading cards may be generated such that the graphical representations of the unique codes are included as aspects of the trading cards.

For example, a graphical representation of a unique code that identifies a trading card may comprise one or more of:

(1) a border of the trading card (or portions thereof) that is to be depicted on the trading card;

(2) background items to be depicted on the trading card (e.g., scenery items or other items depicted in the background of the trading card);

(3) a video game character (or aspects thereof) that is to be depicted on the trading card;

(4) an in-game accessory (or aspects thereof) that is to be depicted on the trading card;

(5) a power (or aspects thereof) that is to be depicted on the trading card;

(6) a watermark embedded into the trading card; or (7) other aspects of the trading card.

In an implementation, card creation subsystem 126 may generate an error detection code (e.g., a cyclic redundancy check (CRC) code, a cryptographic hash, etc.) associated with a unique code of a trading card. Card creation subsystem 126 may then generate a graphic representation of the error detection code based on a graphic coding scheme (e.g., a graphical encoding scheme), and utilize the graphical representation of the error detection code to generate the trading card.

The trading card may be generated such that the graphical representation of the error detection code is included as an aspect of the trading card (e.g., along with the unique code of the trading card). A graphical representation of an error detection code associated with a unique code of a trading card may comprise one or more of:

(1) a border of the trading card (or portions thereof) that is to be depicted on the trading card;

(2) background items to be depicted on the trading card (e.g., scenery items or other items depicted in the background of the trading card);

(3) a video game character (or aspects thereof) that is to be depicted on the trading card;

(4) an in-game accessory (or aspects thereof) that is to be depicted on the trading card;

(5) a power (or aspects thereof) that is to be depicted on the trading card;

(6) a watermark embedded into the trading card; or (7) other aspects of the trading card.

Figure 2:
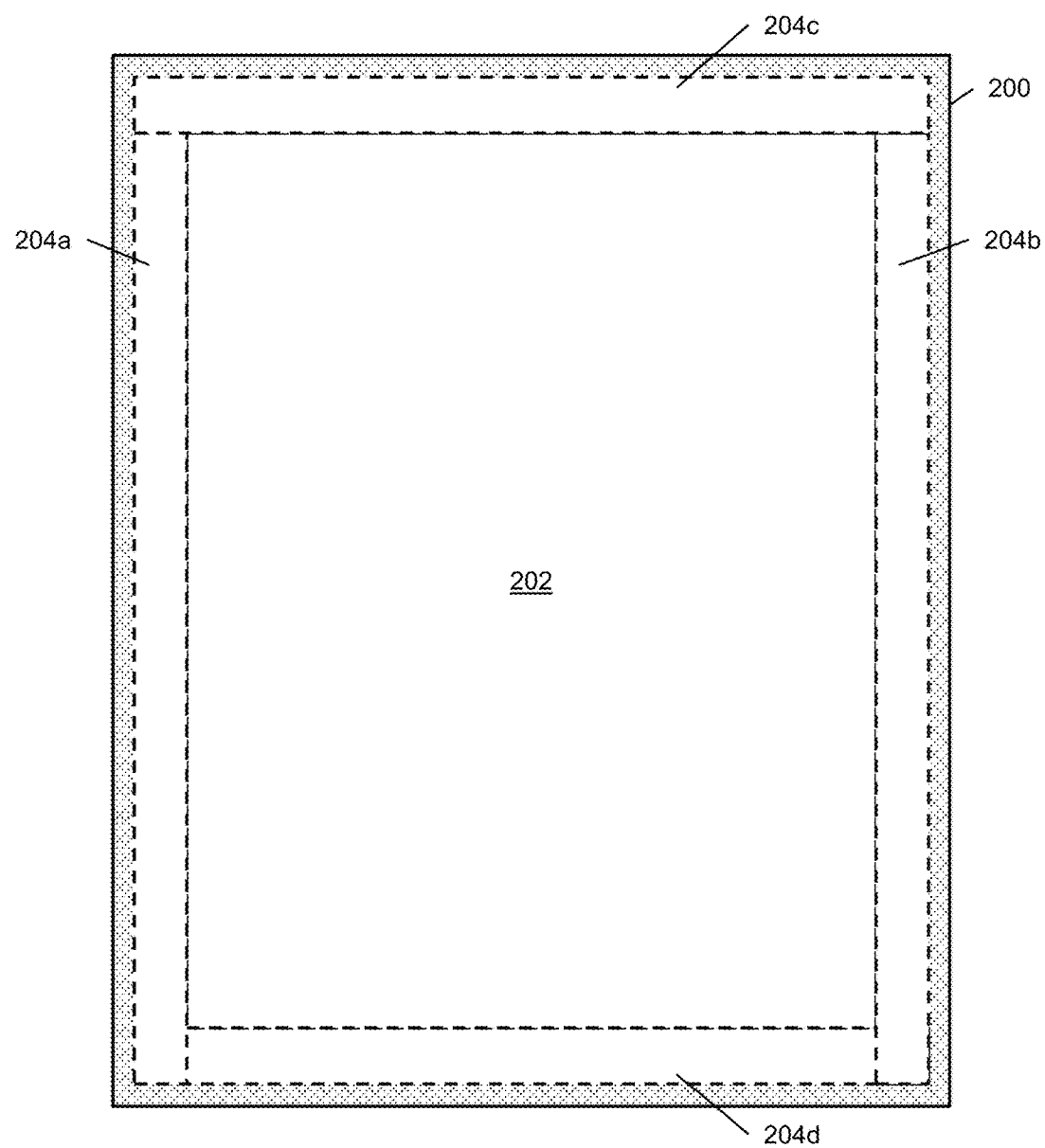
FIG. 2 is an exemplary illustration of a trading card, and of regions of the trading card, according to an implementation of the invention.

As an example, with respect to FIG. 2, a physical trading card 200 may comprise region 202, and regions 204a-204d. Each of regions 202 and 204a-204d may comprise images, text, tactile imprints (e.g., braille transcription), or other aspects of trading card 200. Although regions 202 and 204a-204d are illustrated herein as separate regions, one of skill in the art will appreciate that the regions (or boundaries thereof) may, in some implementations, not be visually separate or distinct from one another (e.g., content in regions 204a-204d may be fully integrated with content in region 202).

In one use case, region 202 may comprise an image of a character of a video game, an in-game accessory for use by a character in the video game, a power available to a character in the video game, or other game item to which trading card 200 corresponds.

Additionally, or alternatively, region 202 may comprise text or tactile imprints that identify or describe a character of a video game, an in-game accessory for use by a character in the video game, a power available to a character in the video game, or other game item to which trading card 200 corresponds.

One or more of regions 204a-204d may comprise one or more portions of a border that surrounds all (or a portion) of region 202.

Figure 3:
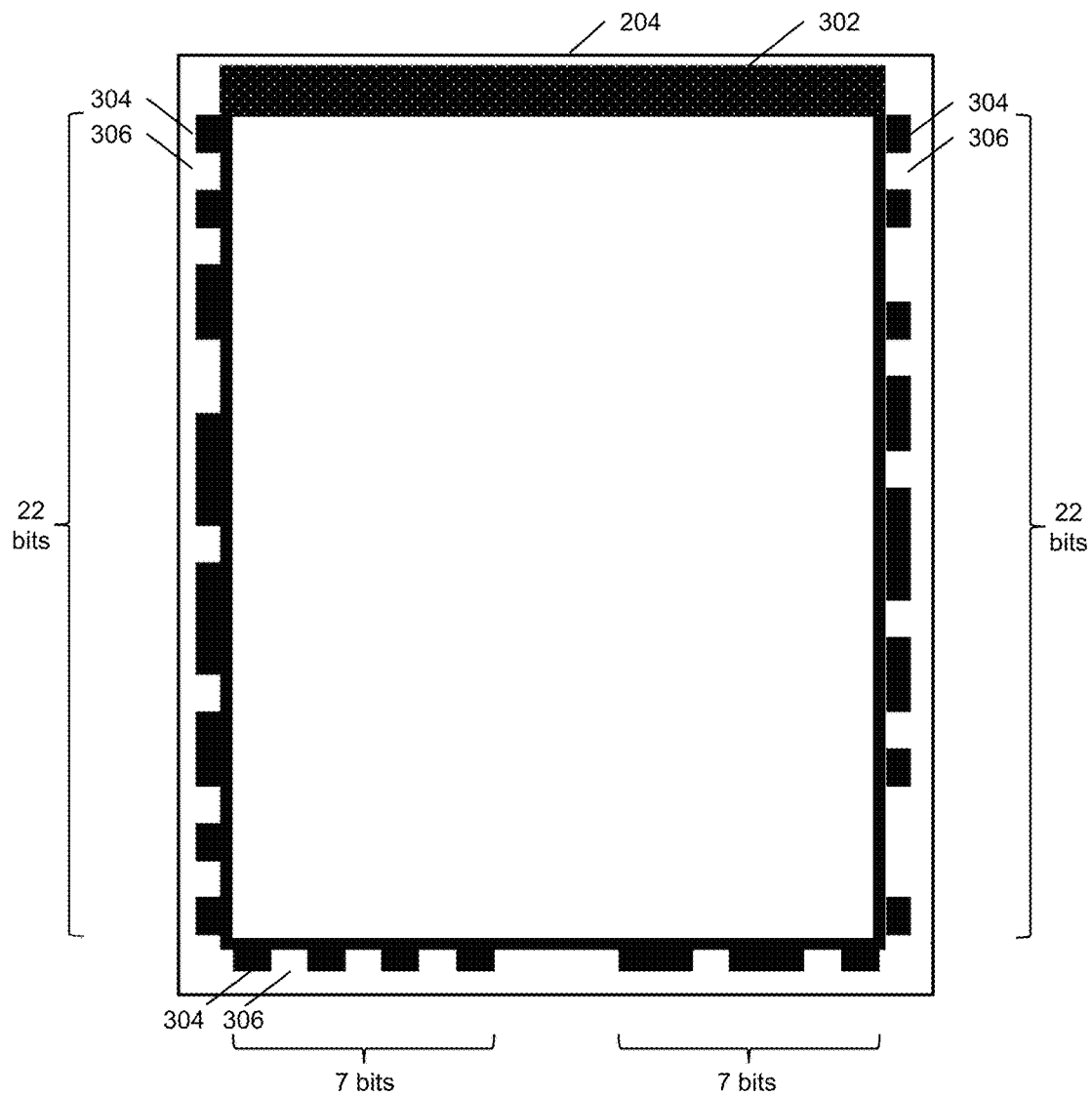
FIG. 3 is an exemplary illustration of a border that includes graphical representations of a unique code of a trading card, an error detection code associated with the unique code, or other aspects of the trading card, according to an implementation of the invention.

With reference to FIG. 3, one or more portions of border 302 depicted within region 204 may comprise a graphical representation of a unique code that identifies trading card 200, as well as a graphical representation of an error detection code generated based on the unique code. The unique code of trading card 200 and/or the error detection code may, for instance, be graphically represented by one or more graphical "on" bits 304 (e.g., a solid block or other graphically-represented bit) and graphical "off" bits 306 (e.g., an empty space, a notch, or other graphically-represented bit).

In one scenario, trading card 200 may comprise two 22-bit arrays of bits 304, 306 positioned vertically (e.g., one on each side of trading card 200), where each 22-bit array represents one half of the unique code of trading card 200. The unique code of trading card 200 may, for example, comprise the 44-bit binary code "10101100111011101101011010010110111011010001," where the left (or first) vertical side array of bits 304, 306 represents the first 22 bits "1010110011101110110101," and the right (or second) vertical side array of bits 304, 306 represents the second 22 bits "1010010110111011010001."

In another scenario, the bits of the unique code of trading card 200 may be randomly distributed along one or more of the top, bottom, or side portions of border 302. The random distribution of the bits may be kept as a "secret" (e.g., stored in card management database 110), and subsequently used to determine the locations of the bits of the unique code to obtain the unique code. Other techniques for representing bits of a unique code on a trading card may of course be utilized.

In yet another scenario, trading card 200 may further comprise two 7-bit arrays of bits 304, 306 positioned horizontally (e.g., from left-to-right along the bottom of trading card 200), where each 7-bit array represents one half of the error detection code associated with the unique code. The error detection code may, for example, comprise the 14-bit binary code "10101011101101," where the bottom-left (or first) array of bits 304, 306 represents the first 7 bits "1010101," and the bottom-right (or second) array of bits 304, 306 represents the second 7 bits of "1101101."

In a further scenario, bits of the error detection code (generated based on the unique code of trading card 200) may be randomly distributed along one or more of the top, bottom, or side portions of border 302. The random distribution of the bits may be kept as a "secret" (e.g., stored in card management database 110), and subsequently used to determine the locations of the bits of the error detection code to obtain the error detection code. Other techniques for representing bits of an error detection code on a trading card may of course be utilized.

Figure 4:
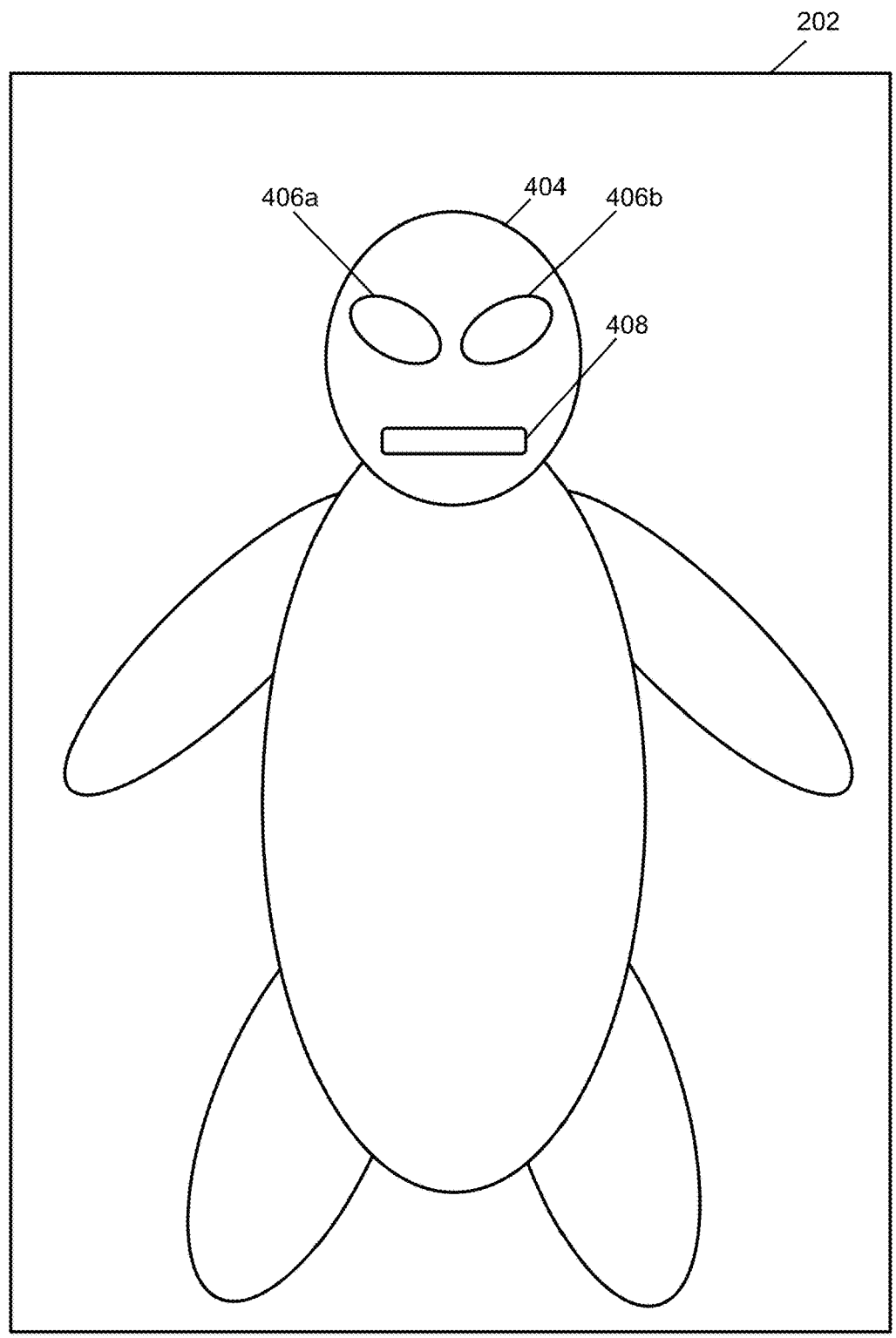
FIG. 4 is an exemplary illustration of a game item (e.g., a character) depicted on a trading card, according to an implementation of the invention.
Figure 5A:
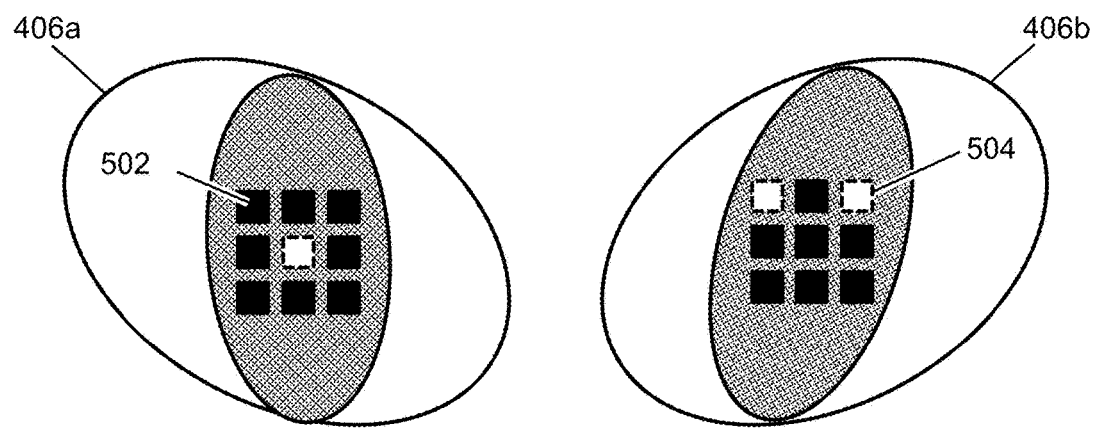
FIGS. 5A-5B are exemplary illustrations of aspects of a character (depicted on a trading card) that include graphical representations of a unique code of a trading card, an error detection code associated with the unique code, or other aspects of the trading card, according to various implementations of the invention.
Figure 5B:
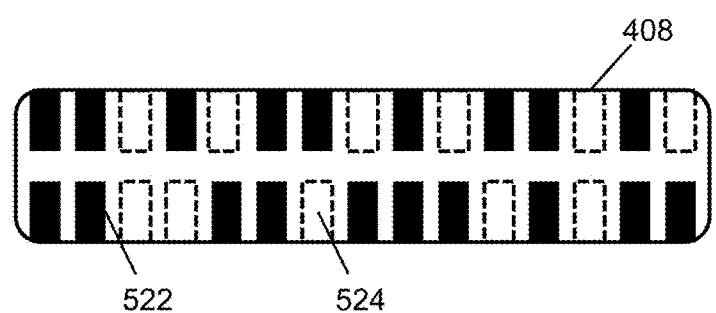

The number of bits and bit arrays of both the unique code and the error detection code, along with the placement of each on trading card 200, may differ in various implementations. For example, with reference to FIG. 4, a game item in the form of video game character 404 is shown within region 202 of trading card 200. Character 404 may comprise a head, a body, two arms, two legs, etc. The head of character 404 may comprise two eyes (406a, 406b), and a mouth 408. With reference to FIGS. 5A-5B, the unique code of trading card 200 or the error detection code may be graphically represented by one or more "on" bits 502, 522 (e.g., a solid block or other graphically-represented bit) and "off" bits 504, 524 (e.g., an empty space, a notch, or other graphically-represented bit).

In one use case, eyes 406a and 406b may each comprise a 9-bit matrix of bits 502, 504 (e.g., that represent the pupils of eyes 406a and 406b), where each 9-bit matrix represents one half of the unique code of trading card 200 or the error detection code associated with the unique code.

In another use case, mouth 408 may comprise two 15-bit arrays of bits 522, 524 (e.g., that represent the teeth of mouth 408), where each 15-bit array represents one half of the unique code of trading card 200 or the error detection code associated with the unique code.

In yet another use case, bits of the unique code of trading card 200 or bits of the error detection code (generated based on the unique code of trading card 200) may be randomly distributed within one or more of the 9-bit matrices (e.g., where each 9-bit matrix represents a pupil of one of the eyes 406a or 406b) or the 15-bit arrays (e.g., where each 15-bit array represents a row of teeth of mouth 408). The random distribution of the bits may be kept as a "secret" (e.g., stored in card management database 110), and subsequently used to determine the locations of the bits of the unique code or the bits of the error detection code to obtain the unique code or the error detection code, respectively. Other techniques for representing bits of a unique code or an error detection code on a trading card may of course be utilized.

Versioning Information

According to an aspect of the invention, a plurality of versions of trading cards may exist. Each trading card version may, for example, correspond to one or more of a different set of unique codes for identifying trading cards, a different graphic coding scheme for generating graphical representations of the unique codes, a different graphic coding scheme for generating graphical representations of error detection codes associated with the unique codes, a different version icon, a different template, etc.

Accordingly, in one implementation, card creation subsystem 126 may obtain versioning information associated with one or more trading cards, and generate the trading cards based on the versioning information. The versioning information may indicate a version to which a trading card corresponds. Additionally, or alternatively, the versioning information may indicate one or more of a set of unique codes that are to be used to identify trading cards of a particular version, a graphical coding scheme that is to be used for generating graphical representations of the unique codes, a graphical coding scheme that is to be used for generating graphical representations of error detection codes associated with the unique codes, one or more version icons that are to be depicted on the trading cards, a template for the trading cards (e.g., a template that indicates locations at which to place various items on the trading cards, formatting for the trading cards, etc.), or other information.

Version Icons

As an example, based on an indication of a version of a trading card (e.g., a version identifier), card creation subsystem 126 may obtain one or more version icons that correspond to the indicated version. Card creation subsystem 126 may generate the trading card such that the trading card comprises the obtained version icons (e.g., by obtaining a template comprising the version icons and generating the trading card using a template).

As a further example, based on the indicated version, card creation subsystem 126 may determine one or more locations on the trading card at which to place the obtained version icons, a graphical representation of a unique code of the trading card, a graphical representation of an error detection code associated with the unique code, or other items.

Figure 6A:
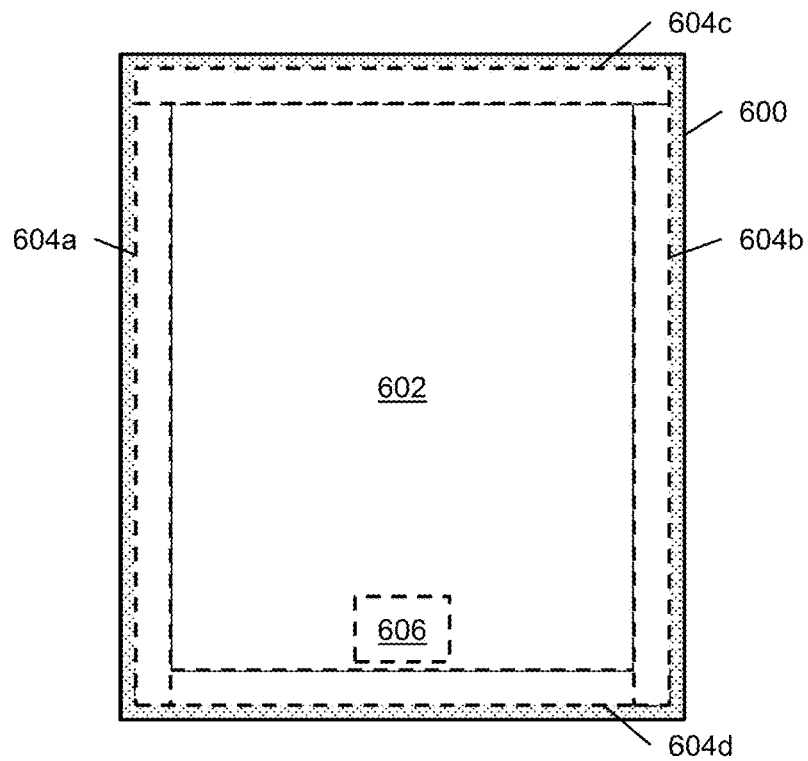
FIGS. 6A-6C are exemplary illustrations of different versions of trading cards, according to various implementations of the invention.

In one scenario, with respect to FIG. 6A, trading card 600 may comprise regions 602, 604a-604d, and 606. Each of regions 602, 604a-604d, and 606 may comprise images, text, tactile imprints, or other aspects of trading card 600. Region 602 may comprise an image of a game item, such as a character of a game, an in-game accessory for use by a character in the game, a power available to a character in the game, or other game item to which trading card 600 corresponds. One or more of regions 604a-604d may comprise one or more portions of a border around all (or a portion of) region 602. Region 606 may comprise a version icon corresponding to a version of trading card 600.

The respective locations at which regions 602, 604a-604d, and 606 are placed on trading card 600 may be based on the version of trading card 600 (e.g., region 606 may be placed at the bottom of region 602 based on the version of trading card 600).

Additionally, or alternatively, the respective locations at which items (e.g., the version icon) are placed within regions 602, 604a-604, and 606 may be based on the version of trading card 600.

Figure 6B:
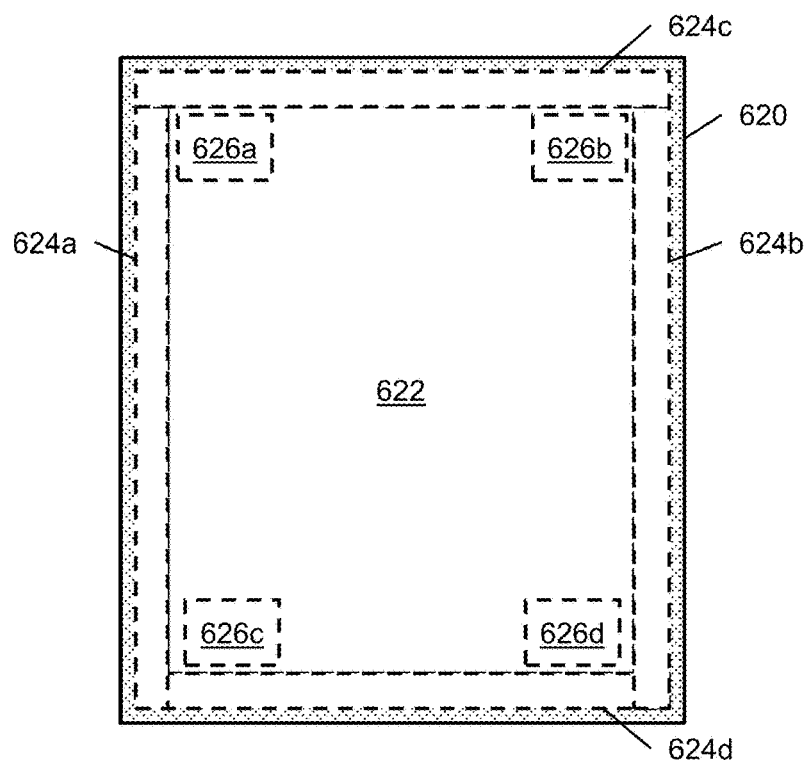

In another scenario, trading card 620 (FIG. 6B) may correspond to a different version than the version of trading card 600 (FIG. 6A). For example, each of regions 622, 624a-624d, and 626a-626d may comprise images, text, tactile imprints, or other aspects of trading card 600. Each of regions 626a-626d may comprise a version icon corresponding to the version of trading card 620, and the locations of regions 626a-626d may be based on the version of trading card 620. The number of regions comprising a version icon and the locations of such regions (e.g., regions 606 and 626a-626d) on the respective trading cards 600 and 620 may be different, for example, because trading cards 600 and 620 respectively correspond to different versions. Additionally, or alternatively, the version icon depicted on trading card 600 may be different than the version icons depicted on trading card 620 (e.g., based on the versions of the trading cards 600 and 620 being different).

Figure 7:
FIG. 7 is an exemplary illustration of a trading card that depicts a border-based graphical representation of a unique code of the trading card, according to an implementation of the invention.

In yet another scenario, with respect to FIG. 7, trading card 700 may comprise a border 702 having graphical "on" bits 704 (e.g., non-notched border portion), graphical "off" bits 706 (e.g., notched border portion), and a version icon 708. Trading card 700 may, for example, be generated based on a template corresponding to a particular trading card version. The corresponding template may comprise version icon 708 or other aspects corresponding to the trading card version (e.g., the template may place version icon 708 and other aspects at predetermined locations). As described elsewhere herein, the version icon may be utilized for validation of trading cards (e.g., to identify a set of unique codes with which to compare a detected unique code, to identify the orientation of a trading card, etc.) or other purposes.

Figure 6C:
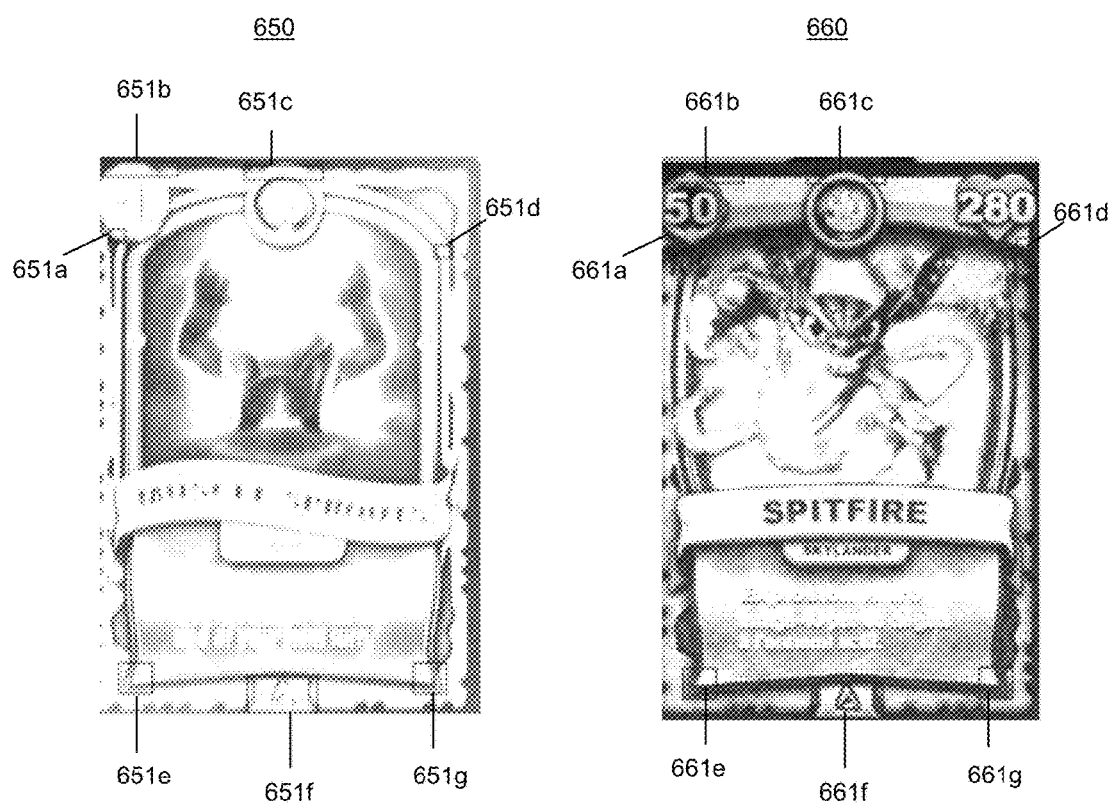

In one implementation, two or more trading cards (e.g., associated with the same version of trading cards, or otherwise affiliated) may be designed to share a predetermined number of common regions or portions (also referred to as "keypoints") to facilitate the detection and validation process (described in additional detail below). In one non-limiting example, with reference to FIG. 6C, a first trading card 650 may depict a first character, and a second trading card 660 may depict a second (different) character. Trading card 650 may comprise, for example, seven keypoints (651a, 651b, 651c, 651d, 651e, 651f, and 651g) that correspond identically and respectively, in both position and content, to seven keypoints (661a, 661b, 661c, 661d, 661e, 661f, and 661g) on trading card 660. Additional trading cards (not pictured) may likewise include the same seven keypoints, even though each trading card may depict a different character or other game item. A keypoint may comprise any type of content including, without limitation, a color, border, text, graphic, or any other aspect of a trading card. Further, the number of shared keypoints may vary in different implementations, along with their positions on the trading cards. In other words, the position, content, and number of shared keypoints on trading cards 650 and 660 in FIG. 6C are exemplary only, and should not be viewed as limiting.

Pre-Printing and/or Pre-Distribution Card Validation

According to an aspect of the invention, electronic copies of trading cards may be validated prior to printing and/or distributing the trading cards to mitigate the number of defective printed and/or distributed trading cards.

Card Validation Subsystem 128

In an implementation, upon generation of an electronic copy of a trading card, card validation subsystem 128 may validate the electronic copy of the trading card. During validation of the electronic copy of the trading card (e.g., a generated file comprising an image of the trading card), card validation subsystem 128 may detect one or more of a graphical representation of a unique code of the trading card, a graphical representation of an error detection code associated with the unique code, a version icon of the trading card, or other aspects of the trading card. Card validation subsystem 128 may then process the detected aspects of the trading card to determine whether the trading card is a valid trading card ready for printing and/or distribution.

If a trading card is determined to be invalid, card validation subsystem 128 may provide a notification for presentation to one or more users (e.g., administrators or other users) regarding the defect, store information regarding the defect in a log (e.g., in card management database 110), or perform other reporting or remedial measures.

In one use case, upon detecting the version icon of the trading card, validation subsystem 128 may determine a version identifier that corresponds to the version icon. The version identifier may be utilized to determine a set of unique codes against which a unique code of the trading card (e.g., that is graphically represented on the trading card) may be queried or compared. Additionally, or alternatively, the detected version icon may be utilized to determine an orientation of the trading card. For example, if the location of the version icon on the trading card is known, the detected location of the version icon relative to other aspects of the trading card may be utilized to determine the orientation of the trading card. The shape, color, or other aspect of the version icon may additionally or alternatively be utilized to determine the orientation of the trading card (e.g., triangular version icon 708 in FIG. 7 has a point directed toward the top center of trading card 700 and a single side that faces (and is parallel to) the bottom center of trading card 700). In other implementations, a versioning icon may have a color that matches a known portion of a trading card (e.g., a top edge of the trading card) to assist in determining the orientation of the trading card.

In a further use case, upon detecting the graphical representation of the unique code of the trading card, card validation subsystem 128 may process the graphical representation of the unique code based on a graphic coding scheme (e.g., a graphic decoding scheme that corresponds to the version of the trading card) to obtain the unique code. Once obtained, card validation subsystem 128 may determine whether the unique code of the trading card is one of the valid unique codes (e.g., one of the unique codes in a set of unique codes that corresponds to the version of the trading card). If the obtained unique code is one of the valid unique codes, card validation subsystem 128 may provide an indication that the trading card is valid (e.g., providing a notification to a user indicating that the trading card is valid, marking the trading card as valid and ready for printing and/or distribution, etc.).

Printing of Trading Cards

Card Printing Subsystem 130

According to an aspect of the invention, card printing subsystem 130 may facilitate printing of one or more trading cards. As an example, card printing subsystem 130 may provide one or more portions of a trading card that is to be printed to a printing system (e.g., a printing service, one or more print servers, a printer, etc.) that may be part of system 100 (not illustrated), or external to system 100. Upon receipt of the trading card portions, the printing system may print the trading card to produce a physical copy of the trading card.

In an implementation, card printing subsystem 130 may provide information relating to a first portion of a trading card to a printing system at a first time, where the first portion is unique to the trading card with respect to a set of trading cards. Card printing subsystem 130 may provide information relating to a second portion of the trading card to the printing system at a second time, where the second portion of the trading card is common to the set of trading cards. Information relating to one or more other portions of the trading card (e.g., another portion that is common to the set of trading cards, another portion that is unique to the trading card, etc.) may also be provided to the printing system at one or more other times. The printing system may then use the information relating to a particular portion of the trading card to determine the contents of that portion of the trading card.

In another implementation, card printing subsystem 130 may provide information relating to one or more portions of one or more other trading cards of the set of trading cards to the printing system, where each of the portions of the other trading cards are respectively unique to one of the other trading cards. Because information relating to one or more common portions (e.g., that are common to the set of trading cards such as the second portion of the trading card) have already been provided to the printing system, these common portions (or related information thereof) need not necessarily be provided again to the printing system (e.g., if the common portions remain stored at the printing system and can be identified for printing the set of trading cards). In this regard, printing and print processing delays associated with sending portions of trading cards (common to all trading cards) to a printing system may be mitigated. Additionally, or alternatively, the bandwidth utilization associated with sending portions of trading cards to the printing system may be reduced.

As an example, with respect to FIG. 2, region 202 of trading card 200 (and items depicted within region 202) may be common to a set of trading cards (e.g., all trading cards of the set may correspond to a character in a game that is depicted in region 202). Regions 204a-204d of trading card 200 (and items depicted within region 202) may be unique to trading card 200 such that other corresponding regions of other trading cards in the same set are different than regions 204a-204d of trading card 200.

Card printing subsystem 130 may transmit a first file (e.g., a PDF file, a PNG file, etc.) of an image that includes region 202 (and does not include one or more of regions 204a-204d) to a printing system, and transmit one or more additional files that includes one or more of regions 204a-204d (e.g., and do not include region 202) to the printing system.

Additionally, or alternatively, card printing subsystem 130 may transmit one or more printing instructions to the printing system for combining the transmitted files to generate a file comprising trading card 200 (e.g., a PDF file, a PNG file, or other file that comprises regions 202 and

204a-204d and other aspects of trading card 200). The printing system may print trading card 200 to produce a physical copy of trading card 200 (e.g., using the printing instructions, the file generated from a combination of the transmitted files, etc.).

Additionally, or alternatively, card printing subsystem 130 may transmit one or more layout instructions to the printing system that instruct the printing system to create the contents of a particular region. For example, card printing subsystem 130 may transmit layout instructions that cause the printing system to create a certain border image to be used in one or more of regions 204a-204d. In some embodiments, the card printing subsystem 130 may comprise a plurality of component images that can be pieced together to form the trading card's unique code in one or more regions 204a-204d. For example, component images may correspond to individual bits of the trading card's unique code, either in a disabled or enabled state. The printing system may use the component images to compose the unique code in one or more regions 204a-204d. In some embodiments, the printing system may be pre-programmed to process layout data into content for one or more regions.

As a further example, with respect to FIG. 2, card printing subsystem 130 may transmit one or more additional files that include regions of other trading cards (in the same set as trading card 200) that are unique to their respective trading cards to the printing system. The regions of the other trading cards that are included in the additional files may, for instance, correspond to regions 204a-204d of trading card 200 (e.g., the corresponding regions and regions 204a-204d may comprise respective borders that graphically represent unique codes of the trading cards, error detection codes of the trading cards, etc.). Because the first file of the image (that includes region 202) has already been transmitted to the printing system, and the image including region 202 is common to trading card 200 and the other trading cards in the set, card printing subsystem 130 need not necessarily transmit the regions of the other trading cards that correspond to region 202 to the printing system. In other words, the already-transmitted image that includes region 202 may be utilized to print the regions of the other trading cards that correspond to region 202 of trading card 200.

As another example, with respect to FIG. 7, an electronic copy of trading card 700 may comprise a combination of layers (e.g., background layer, mask layer, etc.), where one or more of those layers comprise aspects that are common to trading cards in the same set of trading cards as trading card 700 (e.g., same image of a character to which all the trading cards in the set correspond), and one or more other ones of the layers comprise aspects that are unique to trading card 700 (e.g., a graphical representation of a unique code of trading card 700, a graphical representation of an error detection code associated with the unique code, etc.).

Electronic copies of other trading cards in the same set of trading cards may comprise a combination of layers, where one or more of those layers comprise aspects that are common to trading card 700 (and one another), and one or more other ones of the layers comprise aspects that are unique to the respective trading cards. Card printing subsystem 130 may transmit one or more first layers comprising the common aspects to a printing system (e.g., for use in printing trading card 700 or other trading cards in the same set). Card printing subsystem 130 may transmit one or more second layers to the printing system, where each of the second layers comprise one or more aspects that are unique to a respective trading card (e.g., unique to trading card 700, unique to another trading card in the same set, etc.). Additionally, or alternatively, card printing subsystem 130 may transmit one or more printing instructions to the printing system for combining the layers (e.g., placing the layers over one another or using other techniques) to generate electronic copies of the trading cards for printing.

As yet another example, with respect to FIG. 7, card printing subsystem 130 may transmit one or more first layers of trading card 700 (that comprise aspects that are common to other trading cards in the same set of trading cards as trading card 700) to a printing system. To have the printing system print the trading cards in the set with graphical representations of unique codes of the trading cards or error detection codes associated with the unique codes, card printing subsystem 130 may transmit information identifying the unique codes or the error detection codes along with one or more printing instructions (for graphically representing the unique codes or the error detection codes on the trading cards) to the printing system. Additionally, or alternatively, the printing system may be pre-programmed with printing instructions for graphically representing the unique codes or the error detection codes on the trading cards. Upon receipt of the common layers, the unique codes, the error detection codes, or other aspects of the trading cards, the printing system may utilize the received items to print and produce physical copies of the trading cards.

Though the foregoing discussion regarding card printing subsystem 130 discusses providing information relating to various portions of one or more trading cards at varying times, one of ordinary skill will recognize that the information relating to the various portions (including, without limitation, information relating to images, instructions, layout, encodings, component images, layers, or any other discussed portions) may be provided in any sequence and arrangement of files, including at once in a single file.

According to an aspect of the invention, the order and/or arrangement in which trading cards are printed may be defined according to certain parameters. For example, trading cards that are intended to be packaged together may be printed consecutively. Similarly, trading cards that are meant to be distributed in a particular batch (e.g., those relating to a particular geography, version, release wave, or the like) can be arranged to be printed consecutively. Digitally arranging and ordering cards to be printed consecutively may, for example, avoid more complex mechanical arranging and ordering. Digitally arranging and ordering cards may also facilitate the tracking and verification of trading cards. Furthermore, digitally arranging and/or ordering trading cards may allow for non-random card groupings, which can be tuned based on customer feedback and player analytics.

Image Extraction

According to an aspect of the invention, a user (e.g., a game player) that has obtained one or more physical trading cards may desire to "unlock," activate, or otherwise access a game item depicted on a trading card so that it is available for use by the player during gameplay of the video game. Accordingly, a camera, a scanner, or other input device associated with user device 106 may be used to capture an input scene comprising one or more trading cards or other items.

Image Extraction Subsystem 132

In an implementation, image extraction subsystem 132 may receive one or more input streams (e.g., comprising images, videos, etc.) from user device 106. Image extraction subsystem 132 may process the input streams to detect one or more trading card candidates (e.g., items within the input streams that could potentially be valid trading cards).

In one implementation, the one or more input streams may be sampled continuously, at a predetermined interval, or based on changes to a scene (e.g., additional samples may be acquired when the camera focus changes or improves, when a trading card is observed to be oriented at a new angle or otherwise moved, and/or when the camera's zoom levels are changed). The sampling data may then be used to detect one or more trading card candidates and/or unique codes with increased confidence. For example, only data (e.g., bits) present in a predetermined percentage of samples may be deemed as being correctly read (or imaged).

It should be noted that while one or more operations are described herein as being performed by components of card management system 102, those operations may, in some implementations, be performed by components of user device 106. For example, in some implementations, user device 106 may comprise an image extraction subsystem that is similar to, or the same as, image extraction subsystem 132.

According to an aspect of the invention, image extraction subsystem 132 may detect rectangles in the input streams by selecting shapes with appropriate interior angles and height-width ratios, perform perspective correction to obtain "flat" rectangles, or perform other operations to detect the trading card candidates. Additionally, or alternatively, image extraction subsystem 132 may detect predefined reference shapes (e.g., predefined icons, glyphs, symbols, etc.) to detect trading card candidates. For instance, one or more keypoints (such as those described above with reference to FIG. 6C) may be used to detect trading card candidates.

In an implementation, upon detecting a trading card candidate, image extraction subsystem 132 may detect one or more control item candidates on the trading card candidate. Based on the control item candidates, image extraction subsystem 132 may determine whether and/or how further processing of the trading card candidate is to be performed. As an example, the relative location(s) of control items on trading cards may be known (e.g., stored in card management database 110). As such, image extraction subsystem 132 may target the known relative locations on the trading card candidate to detect the control item candidates. The detected control item candidates may be compared against one or more known control items associated with one or more sets of trading cards to determine whether the trading card candidate corresponds to one of the sets of trading cards. If it is determined that the trading card candidates corresponds to a set of trading cards, the trading card candidate may then be further processed (e.g., by card validation subsystem 128) to determine whether the trading card candidate is a valid one of the trading cards of the set of trading cards (and, if so, which one of the trading cards) (e.g., by checking to see if the trading card candidate comprises a graphical representation of a valid unique code).

In one use case, one or more version icons (or other aspects of trading cards) may be used as control items (e.g., if the number of version icons against which version icon candidates are to be compared is "small"). If, for example, the relative location(s) of version icons on trading cards is known, image extraction subsystem 132 may target the known relative locations on a trading card candidate to detect one or more version icon candidates. A detected version icon candidate may be compared against one or more known version icons (that correspond to one or more versions of trading cards) to determine whether the version icon candidate is one of the known version icons. If the version icon candidate is determined to be a particular known version icon that corresponds to a version of trading cards, image extraction subsystem 132 may provide the trading card candidate for further processing to determine whether the trading card candidate is a valid one of the trading cards of the set of trading cards (e.g., by checking to see if the trading card candidate comprises a graphical representation of a valid unique code).

In a further use case, the version icon may be utilized to determine an orientation of the trading card candidate. For example, if the relative location of the version icon on trading cards is known, the detected location of the version icon relative to other aspects of the trading card candidate may be utilized to determine the orientation of the trading card candidate. The shape, color, or other aspect of the version icon may additionally or alternatively be utilized to determine the orientation of the trading card candidate (e.g., triangular version icon 708 has a point directed toward the top center of trading card 700 and a single side that faces the bottom center of trading card 700, a versioning icon may have a color that is closer to a top edge of the trading card and a color that is closer to a bottom edge of the trading card, etc.). The orientation of the trading card candidate may, for example, be utilized to reorient an image of the trading card candidate, and the reoriented image may be provided to card validation subsystem 128 for determining the validity of the trading card candidate.

In one implementation, image extraction subsystem 132 may comprise an troubleshooting mode for providing a user of image extraction subsystem 132 instructions on properly detecting one or more trading cards in a scene. In some embodiments, the troubleshooting mode may provide feedback (e.g., visual, audio, haptic, etc.) when portions of a trading card have been recognized or recognized to within a threshold certainty. In some embodiments, the troubleshooting mode may be presented to the user after a predefined number of failed attempts to recognize a trading card. Additionally or alternatively, the user may manually enable the troubleshooting mode.

Post-Printing and/or Post-Distribution Card Validation

In an implementation, card validation subsystem 128 may receive one or more trading cards (e.g., images of one or more trading card candidates from image extraction subsystem 132), and process the trading cards to determine whether the trading cards are valid and/or to identify the trading cards (e.g., by identifying their respective unique codes). As an example, upon receipt of a trading card, card validation subsystem 128 may detect one or more of a graphical representation of a unique code of the trading card, a graphical representation of an error detection code associated with the unique code, a version icon of the trading card, or other aspects of the trading card. Card validation subsystem 128 may then process the detected aspects of the trading card to determine whether the trading card is a valid trading card, and, if valid, to identify the trading card (e.g., by identifying its unique code).

In an implementation, one or more version icons depicted on a trading card may be utilized to validate the trading card. As an example, a version icon may correspond to a version identifier associated with a version of trading cards, where a set of trading cards belonging to the same version is associated with a set of unique codes that are to be used for identifying the trading cards of the set of trading cards. As such, upon detecting the version icon of the trading card, card validation subsystem 128 may utilize the version icon to determine the corresponding version identifier. Card validation subsystem 128 may then utilize the version identifier to determine the set of unique codes against which a unique code of the trading card (e.g., that is graphically represented on the trading card) may be queried or compared. Upon detecting the graphical representation of the unique code of the trading card, card validation subsystem 128 may process the graphical representation of the unique code based on a graphic coding scheme (e.g., a graphic decoding scheme that corresponds to the version of the trading card) to obtain the unique code. Once obtained, card validation subsystem 128 may determine whether the unique code of the trading card is one of the valid unique codes (e.g., one of the unique codes in a set of unique codes that corresponds to the version of the trading card). If the obtained unique code is one of the valid unique codes, card validation subsystem 128 may provide an indication that the trading card is valid.

As another example, a graphical coding scheme (e.g., a graphic encoding scheme, a graphic decoding scheme, etc.) may be associated with a version of trading cards (or a version identifier thereof). Upon detecting the version icon of the trading card, card validation subsystem 128 may utilize the version icon to determine the corresponding version identifier. Card validation subsystem 128 may then utilize the version identifier to determine the graphic coding scheme for decoding a graphical representation of a unique code of the trading card, and obtain the unique code based on the graphic coding scheme. Once obtained, card validation subsystem 128 may determine whether the unique code of the trading card is one of the valid unique codes (e.g., one of the unique codes in a set of unique codes that corresponds to the version of the trading card). If the obtained unique code is one of the valid unique codes, card validation subsystem 128 may provide an indication that the trading card is valid.

As indicated, in some implementations, multiple versions of trading cards may exist, and individual ones of the multiple versions may each have its own version icon(s) (or other version indicator) that represents the respective version of trading cards. In an implementation, each version of trading cards may be associated with a set of unique codes, where each of the unique codes of the same set is unique with respect to one another, but not necessarily unique with respect to other sets of unique codes. In this way, the use of multiple versions may allow for a large (if not unlimited) unique code space. In another implementation, each version of trading cards may be associated with a graphic coding algorithm (e.g., comprising a graphic coding scheme) for encoding codes (e.g., unique codes, error detection codes, etc.), decoding graphical representations of codes (e.g., unique codes, error detection codes, etc.), etc. As such, for example, the use of the version icon may allow for algorithmic improvements or other modifications to the encoding or decoding processes, backward compatibility for older versions of trading cards, or other benefits.

In an implementation, a unique code of a trading card may comprise one or more control bits (e.g., registration bits or other control bits). As an example, the control bits may be utilized for determining the locations of other bits of the unique code (e.g., the payload) that are represented on the trading card. In one use case, with respect to FIG. 3, trading card 200 may comprise two side 22-bit arrays of bits 304 and 306, where each 22-bit array represents one half of the unique code of trading card 200. The unique code of trading card 200 may, for example, comprise the 44-bit binary code "1010110011101110110101101001011011011010001," where the left side array of bits 304 and 306 represents the first 22 bits "1010110011101110110101," and the right side array of bits 304 and 306 represents the second 22 bits "1010010110111011010001." The control bits may comprise the first and last bit of each 22-bit array (e.g., set as "1"), while the remaining bits constitute the payload. When graphically represented, for example, the predefined control bits may be utilized to form a grid (e.g., the top most and bottom most bits of the unique code represented on the left side array and right side array, respectively, may be utilized as the corner points of the grid). Based on the grid, card validation subsystem 128 may extract the graphical representation of the unique code from the trading card.

Of course, the foregoing arrangement of bits and the number of bits (e.g., that represent a unique code or a portion thereof) are merely exemplary. As an example, the bits of a unique code may be arranged in any fashion on the trading card, including in arrays on any number of sides of the trading card. The number of bits representing a unique code may be modified to accommodate a larger or smaller number space (e.g., on which the unique code may be based). In another embodiment, the unique code may, for example, comprise two 24-bit arrays, each array containing two control bits.

In an implementation, an error detection code represented on a trading card (e.g., a CRC code generated from a unique code of the trading card) may be utilized to detect or correct errors related to incorrect reading of a unique code represented on the trading card. As with the unique code, the size of the error detection code may vary and the bits representing the error detection code may be embedded anywhere in the trading card. For example, in some embodiments, a 10-bit error detection code may be embedded along a particular side of the trading card or be distributed at known locations within the unique code itself.

In-Game Content

In an implementation, once obtained, a unique code of a trading card may be utilized to activate one or more benefits associated with the trading card in a game. As an example, if a unique code of a physical trading card is obtained during a user's game session, virtual card collection subsystem 144 may obtain a virtual trading card corresponding to the physical trading card based on the unique code of the physical trading card, and add the corresponding virtual trading card to the user's virtual card collection in the game (e.g., by associating the corresponding virtual trading card with the user's identifier associated with the user's account). In one use case, after the corresponding virtual trading card is added to the user's virtual card collection, the user may utilize the virtual trading card to battle other users in the game, trade the virtual trading card with other users in the game for other in-game benefits (e.g., other virtual trading cards, virtual currency, or other benefits), etc. Game space subsystem 142 may, for example, provide a battle arena in which users may battle one another with their respective virtual trading cards, an in-game marketplace in which users may trade their respective virtual trading cards, etc.

As another example, a character in a game, an in-game accessory for use by a character in the game, a power available to a character in the game, or other game item may be associated with a physical trading card. When the unique code of the physical trading card is obtained, user management subsystem 146 may provide the associated game item to the user in the game based on the unique code of the trading card. In one scenario, user management subsystem 146 may activate and add the associated game item to the user's account so that the user can access the associated game item when the user is logged into his/her account (e.g., the game item may be associated with the user's identifier that corresponds to his/her account). When logged in, for example, the user may utilize the game item (e.g., a character) to battle other users in the game.

As another example, trading cards featuring characters or in-game items duplicative of characters or in-game items previously added to a user's account may be used to provide additional benefits to the user. For example, if a user had previously added a particular character to his/her account, presenting another trading card featuring the same character—but different unique code—to the system could provide additional benefits to the user such as increasing the level, powers, or items of the character.

In an implementation, a trading card may be utilized to provide one or more augmented reality aspects (e.g., of a game). As an example, upon detecting a character in a game, an in-game accessory for use by a character in the game, a power available to a character in the game, or other game item that is depicted on a physical trading card, game space subsystem 142 may provide a virtual counterpart corresponding to the depicted game item for presentation to a user (e.g., on the user's device). In one use case, the virtual counterpart (and other game-related components such as in-game characters, objects, and user interface components such as energy meters, menus, score displays, etc.) may be overlaid over an input scene (e.g., a real-world image stream being captured by a user device). The user may also be enabled to interact with the virtual counterpart. For example, game space subsystem 142 may detect the user's actions in the image stream (e.g., a user may swipe at the virtual counterpart, "touch" the virtual counterpart, etc., within the viewpoint of a user device), and cause the virtual counterpart to "react" to the detected user action.

As previously noted, although implementations described herein are with respect to trading cards, it is understood that (to the extent possible) other objects may be used in place of trading cards in other implementations. Non-limiting examples of other objects that may be used in place of trading cards include, for instance, figurines (e.g., action figures or other figurines), figurine accessories, real-world items that correspond to game items, or other objects. As an example, a graphical representation of a unique code for identifying a figurine or figurine accessory may be generated, and used to print the figurine or figurine accessory (e.g., via a 3D printing system) such that the printed figurine or figurine accessory comprises the graphical representation of the unique code.

As a further example, the figurine or figurine accessory may correspond to a game item (e.g., a corresponding character or character accessory in a game), and a user may "unlock," activate, or otherwise access the game item so that it is available for use by the user during gameplay in the game. In one use case, for instance, a scanner, or other input device associated with user device 106 may be used to capture an input scene comprising the figurine or figurine accessory (or other objects).

Exemplary Flowcharts

Figure 8:
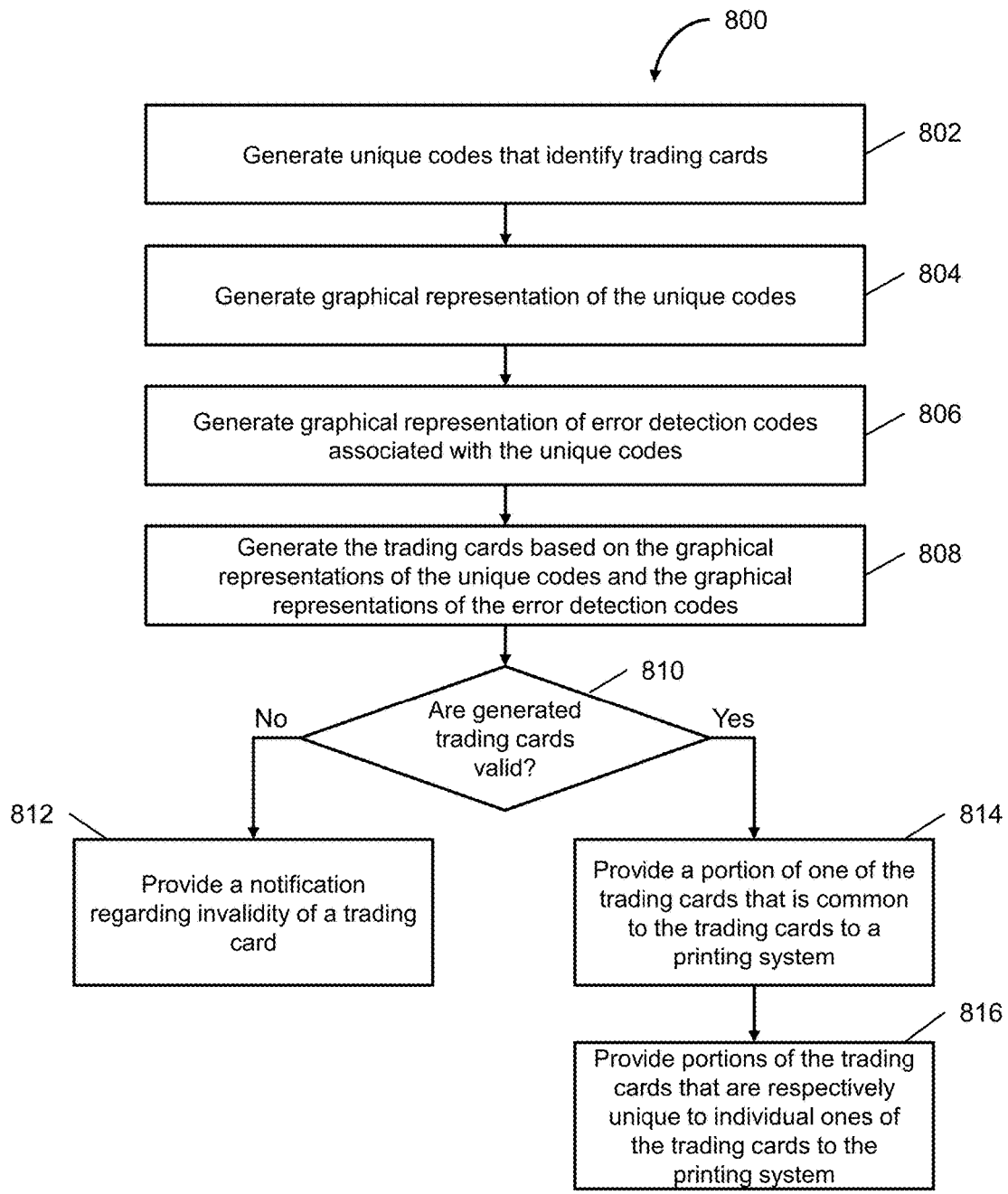
FIG. 8 is an exemplary illustration of a flowchart of a method of creating and printing physical trading cards, according to an implementation of the invention.
Figure 9:
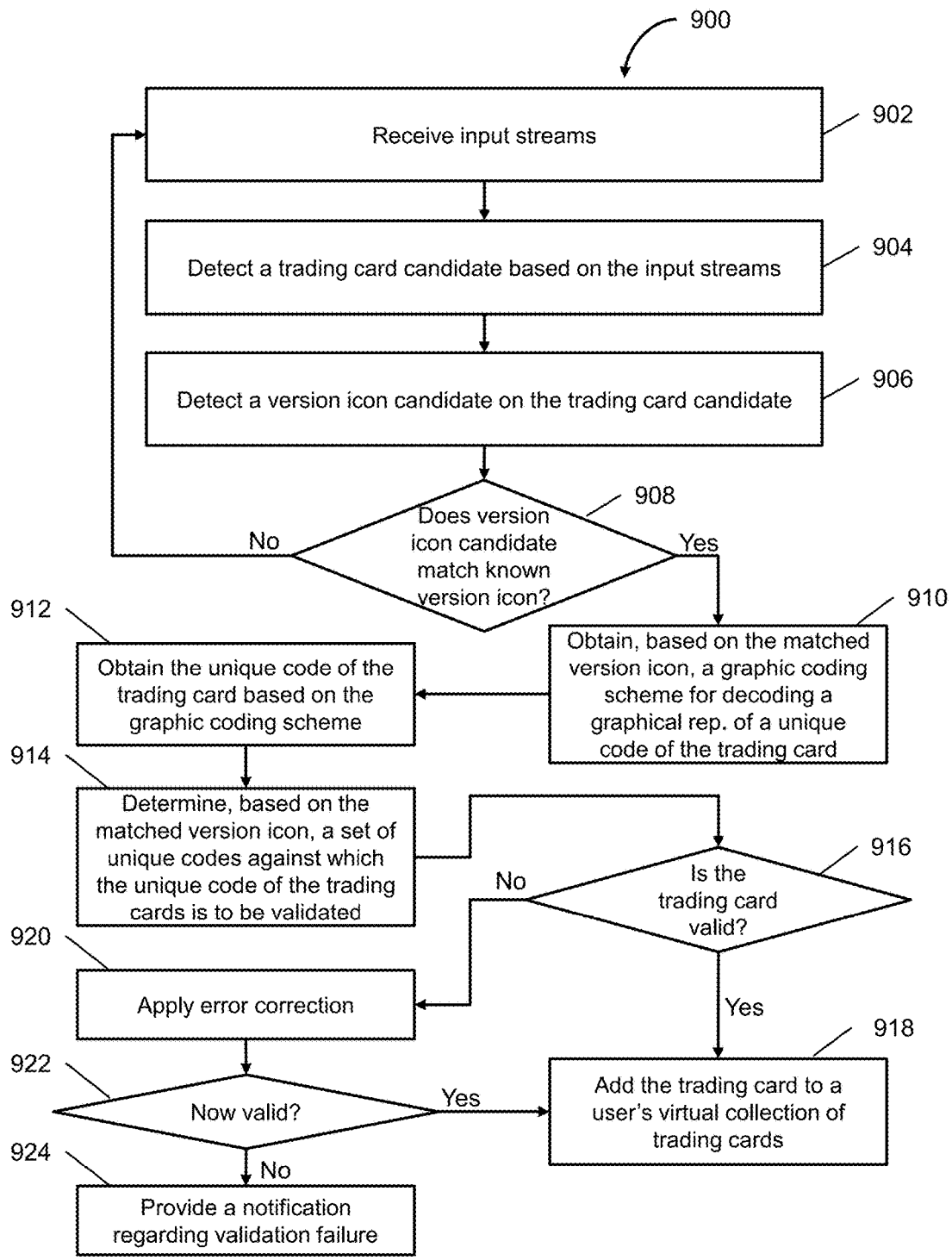
FIG. 9 is an exemplary illustration of a flowchart of a method of identifying and validating trading cards, according to an implementation of the invention.

FIGS. 8 and 9 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

FIG. 8 is an exemplary illustration of a flowchart of a method of creating and printing physical trading cards, according to an implementation of the invention.

In an operation 802, one or more unique codes that identify one or more trading cards may be generated. Operation 802 may be performed by a card code generation subsystem that is the same as or similar to card code generation subsystem 122, in accordance with one or more implementations.

In an operation 804, one or more graphical representations of the unique codes may be generated. As an example, a graphic coding scheme (e.g., a graphic encoding scheme) may be selected based on a trading card version to which the trading cards correspond. The graphical representations of the unique codes may be generated based on the selected graphic coding scheme. Operation 804 may be performed by a graphic coding subsystem that is the same as or similar to graphic coding subsystem 124, in accordance with one or more implementations.

In an operation 806, one or more graphical representations of one or more error detection codes associated with the unique codes may be generated. As an example, a graphic coding scheme (e.g., a graphic encoding scheme) may be selected based on a trading card version to which the trading cards correspond. The graphical representations of the error detection codes may be generated based on the selected graphic coding scheme. Operation 806 may be performed by a graphic coding subsystem that is the same as or similar to graphic coding subsystem 124, in accordance with one or more implementations.

In an operation 808, the trading cards may be generated based on the graphical representations of the unique codes and the graphical representations of the error detection codes. Operation 808 may be performed by a card creation subsystem that is the same as or similar to card creation subsystem 126, in accordance with one or more implementations.

In an operation 810, a determination of whether one or more of the generated trading cards are valid trading cards may be effectuated. As an example, an electronic copy of a given trading card may be processed to obtain a graphical representation of a unique code of the trading card, and the graphical representation of the unique code may be processed to obtain the unique code. The obtained unique copy may be compared against a set of valid unique codes. If the obtained unique code matches one of the valid unique codes of the set, it may be determined that the trading card is a valid trading card. On the other hand, if the obtained unique code does not match any of the valid unique codes of the set, it may be determined that the trading card is not valid (e.g., and, thus, a defectively generated trading card). Operation 810 may be performed by a card validation subsystem that is the same as or similar to card validation subsystem 128, in accordance with one or more implementations. As an example, with respect to a given trading card, method 800 may proceed to an operation 812 responsive to a determination that the trading card is not valid. With respect to the trading card, method 800 may proceed to an operation 814 responsive to a determination that the trading card is valid.

In operation 812, a notification regarding invalidity determination of one or more trading cards may be provided. As an example, the notification may be provided to alert one or more users (e.g., an administrator or other user) with respect to a defect in generating one or more of the trading cards. Operation 812 may be performed by a card validation subsystem that is the same as or similar to card validation subsystem 128, in accordance with one or more implementations.

In operation 814, a portion of one of the trading cards that is common to the trading cards (e.g., a "common" portion) may be provided to a printing system (e.g., without providing other portions of other ones of the trading cards that corresponds to the "common" portion of the one trading card). As an example, only because the portion is common to all trading cards of the given set of trading cards, other portions of other ones of the trading cards that correspond to the "common" portion (of the one trading card) do not necessarily need to be provided to the printing system. Operation 814 may be performed by a card printing subsystem that is the same as or similar to card printing subsystem 130, in accordance with one or more implementations.

In an operation 816, portions of the trading cards that are respectively unique to individual ones of the trading cards may be provided to the printing system. Operation 816 may be performed by a card printing subsystem that is the same as or similar to card printing subsystem 130, in accordance with one or more implementations.

FIG. 9 is an exemplary illustration of a flowchart of a method of detecting and validating trading cards, according to an implementation of the invention.

In an operation 902, one or more input streams may be received. Operation 902 may be performed by an image extraction subsystem that is the same as or similar to image extraction subsystem 132, in accordance with one or more implementations.

In an operation 904, a trading card candidate may be detected based on the input streams. Operation 904 may be performed by an image extraction subsystem that is the same as or similar to image extraction subsystem 132, in accordance with one or more implementations.

In an operation 906, a version icon candidate on the trading card candidate may be detected. Operation 906 may be performed by an image extraction subsystem that is the same as or similar to image extraction subsystem 132, in accordance with one or more implementations.

In an operation 908, a determination of whether the version icon candidate matches a known version icon may be effectuated. Operation 908 may be performed by a card validation subsystem that is the same as or similar to card validation subsystem 128, in accordance with one or more implementations. As an example, method 900 may proceed to operation 902 responsive to a determination that the version icon candidate does not match a known version icon (e.g., the trading card candidate may not be a known trading card). Method 900 may proceed to an operation 910 responsive to a determination that the version icon candidate matches a known version icon (e.g., the trading card candidate may a known trading card).

In operation 910, a graphic coding scheme (for decoding a graphical representation of a unique code of the trading card (or the trading card candidate) may be obtained based on the matched version icon. Operation 910 may be performed by a card validation subsystem that is the same as or similar to card validation subsystem 128, in accordance with one or more implementations.

In an operation 912, the unique code of the trading may be obtained based on the graphic coding scheme. Operation 912 may be performed by a card validation subsystem that is the same as or similar to card validation subsystem 128, in accordance with one or more implementations.

In an operation 914, a set of unique codes (against which the obtained unique code of the trading card is to be validated) may be determined based on the matched version icon. Operation 914 may be performed by a card validation subsystem that is the same as or similar to card validation subsystem 128, in accordance with one or more implementations.

In an operation 916, a determination of whether the trading card is a valid trading card may be effectuated. As an example, the determination may be based on a comparison of the obtained unique code against the obtained set of unique codes (which are known to be valid unique codes). If the obtained unique code matches one of the known valid unique codes, it may be determined that the trading card is a valid trading card. On the other hand, if the obtained unique code does not match any of the known valid unique codes, it may be determined that the trading card is not a valid trading card. Operation 916 may be performed by a card validation subsystem that is the same as or similar to card validation subsystem 128, in accordance with one or more implementations. As an example, method 900 may proceed to an operation 918 responsive to a determination that the trading card is a valid trading card. Method 900 may proceed to an operation 920 responsive to a determination that the trading card is not a valid trading card.

In operation 918, the trading card may be added to a user's virtual collection of trading cards. As an example, a user may scan a physical copy of the trading card to add the trading card to the user's virtual trading card collection in a game (e.g., so that the virtual copy of the trading card may be utilized by the user in the game to carry out one or more objectives of the game). If the trading card is determined to be valid, the trading card may be added to the user's virtual trading card collection, and the virtual copy of the trading card may be activated for the user to use in the game. Operation 918 may be performed by a virtual card collection subsystem that is the same as or similar to virtual card collection subsystem 144, in accordance with one or more implementations.

In operation 920, error correction may be applied (e.g., to the unique code obtained from decoding a graphical representation thereof) to attempt to obtain a valid unique code. Operation 920 may be performed by a card validation subsystem that is the same as or similar to card validation subsystem 128, in accordance with one or more implementations.

In an operation 922, a determination of whether the trading card is a valid trading card may be effectuated. As an example, after error correction is applied, a unique code obtained from decoding a graphical representation thereof, the error-corrected unique code may be compared against a set of unique codes (which are known to be valid unique codes) to determine whether the error-corrected unique code matches one of the known valid unique codes. Operation 922 may be performed by a card validation subsystem that is the same as or similar to card validation subsystem 128, in accordance with one or more implementations. As an example, method 900 may proceed to an operation 918 responsive to a determination that the trading card is a valid trading card. Method 900 may proceed to an operation 924 responsive to a determination that the trading card is not a valid trading card.

In operation 924, a notification regarding a validation failure may be provided. As an example, when a user scans a physical copy of the trading card, and the processing of the scan results in an invalidity determination, a notification regarding the validation failure may be provided to the user. In some embodiments, a user may be "locked out" of the trading card detection and validation process after a certain number of validation failures within a certain period of time. For example, three validation failures within a ten-minute time period may cause a one-hour lockout. In some embodiments, the lockout period may progressively increase as validation failures accumulate. In some embodiments, repeated validation failures relating to a particular unique code may be handled differently from multiple validation failures relating to different unique codes. In particular, the latter scenario may indicate a brute force attempt at randomly guessing valid codes, while the former may be more indicative of a genuine detection error. Operation 924 may be performed by a card validation subsystem that is the same as or similar to card validation subsystem 128, in accordance with one or more implementations.

Image-Based Template Matching

Figure 10:
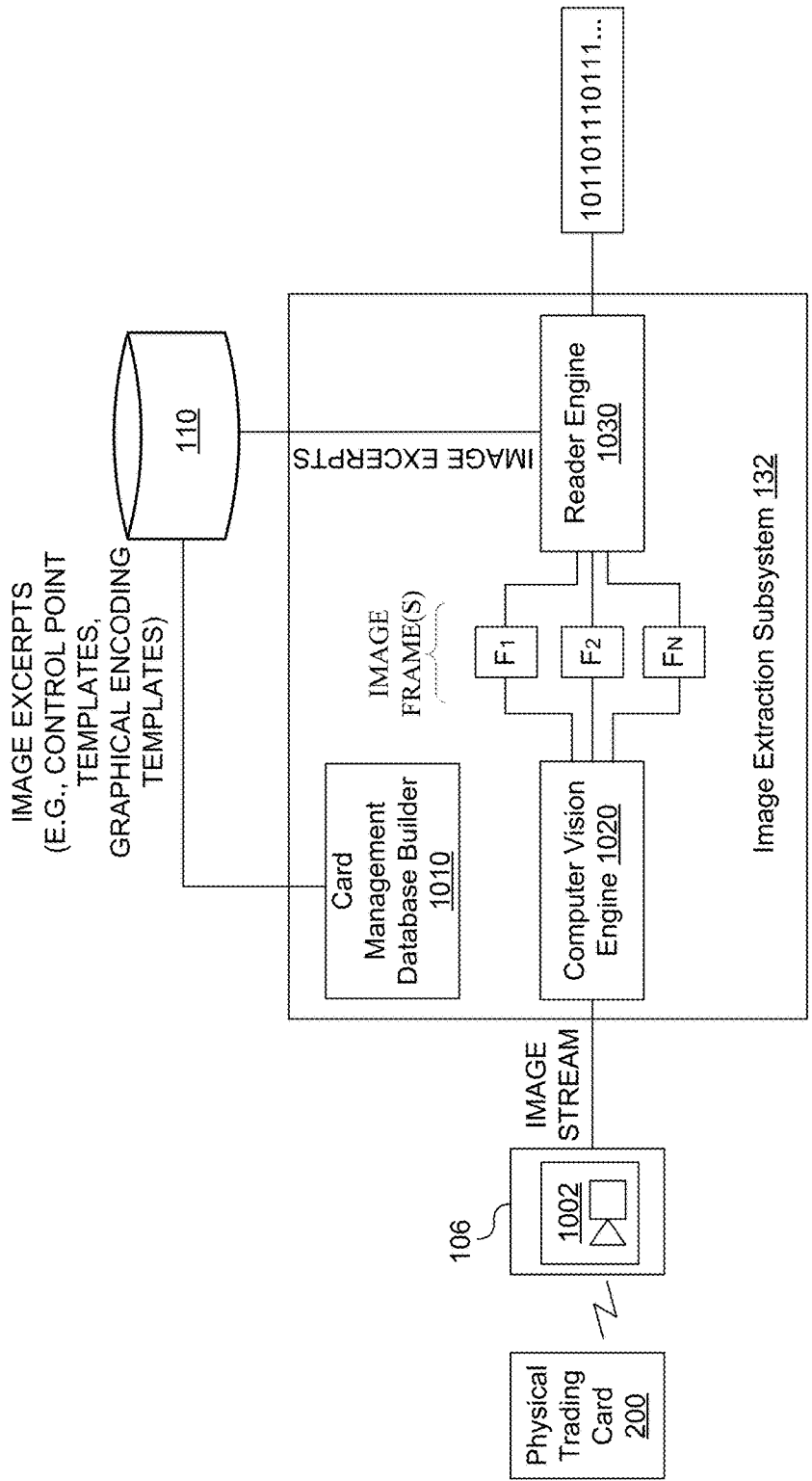
FIG. 10 illustrates an exemplary image extraction subsystem and related data flows, according to an implementation of the invention.

One aspect of the invention relates to reading graphically-encoded identifiers from physical trading cards through image-based template matching. For example, in one implementation, image extraction subsystem 132 (of FIG. 1) may further comprise, without limitation, a card management database builder 1010, a computer vision engine 1020, a reader engine 1030, and/or other components as shown in FIG. 10.

Generating and Storing Control Point and Graphical Encoding Indicia Templates

According to an aspect of the invention, card management database builder 1010 may obtain and store image excerpts of actual trading cards at the time of creation (or at another time). Each excerpt may include an actual portion of an image of a trading card (e.g., obtained from an actual image of the entire trading card such as by cropping, or may be generated as a portion that is to be digitally assembled with other portions to form an actual image of the entire trading card), or a rendition of a portion of the trading card (e.g., not a portion of an actual trading card), as long as the image excerpt may be used for comparison and matching with actual images of trading cards.

In some implementations, a given image excerpt may be stored as a control point template, which may comprise an image of a particular portion of a trading card. The location may, for example, comprise a "top-left corner" portion, a "top-right corner" portion, a "bottom-left corner" portion, a "bottom-right corner" portion, and/or other portion of the trading card (in which directional descriptions relate to a card being held in an upright (or other) position relative to the ground or other frame of reference). In these implementations, card management database builder 1010 may store portion identification information that identifies the particular portion in association with the control point template in the card management database 110, along with position information that indicates a location on the trading card to which the portion relates.

For example, portion identification information "top-left corner" (and/or other type of identification information) may be stored in association with an image of the top-left corner portion of the trading card, as well as a location that specifies the top left portion of the trading card to which the portion relates. In this manner, a given control point template may be associated with a particular position on a trading card. As will be described more fully with reference to reader engine 1030 below, a control point template may be used to determine a position of an image of a trading card within an image frame. For example, if a "top-left corner" control point template matches (through image processing comparisons of a control point template and an image of a trading card in an image frame), the matching areas of the image frame may be determined to correspond to the top-left corner of the trading card, which may assist in locating and/or orientating an image of the trading card in an image frame.

In some implementations, a given image excerpt may be stored as a graphical encoding template, which is an image of a graphical encoding indicator that graphically encodes a value. In some implementations, the encoded value may, for example, comprise a binary value (such as an "on" value that encodes the numeral one and an "off" value that encodes the numeral zero). In these implementations, and with reference to FIG. 7, card management database builder 1010 may store an "on" graphical encoding template (hereinafter also referred to as an "on template") that corresponds to a graphical "on" bit 704, and an "off" graphical encoding template (hereinafter also referred to as an "off template") that corresponds to a graphical "off" bit 706. Each graphical encoding template may be stored in association with its corresponding value. For example, an identifier for the on graphical encoding template (and/or the on graphical encoding template itself) may be stored in association with its corresponding value in the card management database.

As will be described more fully with reference to reader engine 1030 below, a trading card may include one or more graphical identification regions that include a plurality of graphical encoding indicators, each indicator encoding either an "on" value or an "off" value based on a unique graphical characteristic (e.g., shape, color, size, etc.). These graphical encoding indicators may be integrated within a design of the trading card and may be read based on image comparisons with graphical encoding templates that are each associated with an "on" or "off" value, permitting various types of distinguishable set of graphical encoding indicators (e.g., having various shapes, colors, sizes, etc.) to be used to encode a value. This is unlike a bar code or similar coding that is conspicuous on and not integrated within a design, and has indicators (e.g., black lines) whose relative widths are used to decode the bar code without image comparisons to templates. Comparison of each of the plurality of graphical encoding indicators to the "on" template and the "off" template allows the system to decode the graphical encoding indicators into "on" or "off" values.

Although binary values are described as various examples of encoded values, other types of values (e.g., non-binary values) may be used as well. In these instances, card management database builder 1010 may obtain and store more than two graphical encoding templates, with each graphical encoding template corresponding to a particular value in a non-binary encoding scheme.

FIGS. 11-14 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

Figure 11:
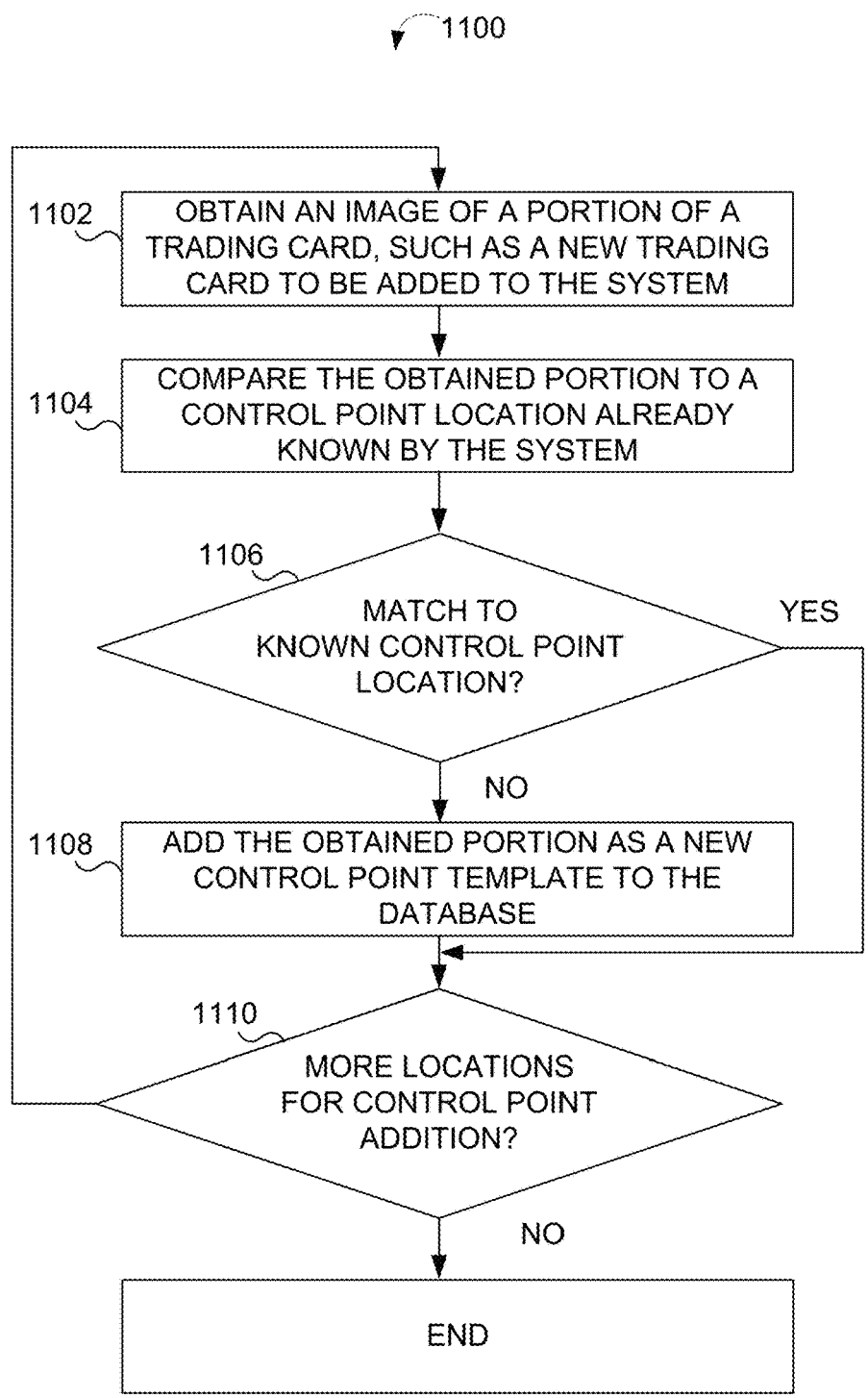
FIG. 11 is an exemplary illustration of a flowchart of a method of adding a control point template of a trading card to a card management database that includes image excerpts of actual trading cards used to position trading cards in an image frame, each control point template comprising only a portion of a trading card, according to an implementation of the invention.

FIG. 11 is an exemplary illustration of a flowchart of a process 1100 of adding a control point template of a trading card to a card management database (that includes image excerpts of actual trading cards used to position trading cards in an image frame), each control point template comprising only a portion of a trading card, according to an implementation of the invention. Process 1100 may be used, for example, when a trading card has been or will be printed, and has not yet been input into the system. When building a database of control point templates (e.g., card management database 110), one goal is to add control point templates that are common to all trading cards in order to minimize the amount of downstream processing necessary to position a given trading card using the control point templates. However, because a given trading card may be unique relative to other trading cards, it is likely (given a sufficient number of trading cards known by the system) that two trading cards will not share a common set of image features at a particular location (e.g., top-left corner). In these instances, at least two control point templates may be stored and recognized for that particular location (e.g., at least two top-left corner templates).

In an operation 1102, process 1100 may include obtaining an image of a portion of a trading card, such as a new trading card to be added to the system. In some implementations, obtaining the image of the portion may include obtaining a control point location configuration that specifies one or more locations of a trading card that should serve as a basis for one or more control points. Each location may be specified as an absolute or relative position. For example, a given location may be specified by one or more absolute pixel coordinates (e.g., a bounding box set of pixel coordinates to define a square or rectangle, a point defined by a pixel position and a radius defined by a number of pixels, etc.). In another example, a given location may be specified by one or more relative coordinates such as a percentage of the size of the trading card starting from a particular edge (e.g., top-left edge). In either implementation, operation 1102 may include clipping an appropriate portion of the image of the trading card based on a location specified by the control point specification. In this manner, process 1100 facilitates automation of entering trading cards into the system that have not otherwise been added. Operation 1102 may require that the image of the trading card meet or exceed a certain quality (e.g., minimum image clarity, correct perspective, correct orientation, etc.). Alternatively or additionally, at least some portions may be obtained from a user that uploads a portion of an image of a trading card for possible addition to the database.

In an operation 1104, process 1100 may include comparing the obtained portion to a control point location already known by the system (e.g., already stored in card management database 110). Such comparison may include template matching techniques such as, without limitation, normalized cross correlation. In template matching, portions of an image, such as portions of the a control point location already known by the system, may be continuously sampled along a window to determine whether a match to a template, such as the obtained portion, occurs. The window may define a size of the portions of the image to sample at a given time. Larger window sizes may result in a greater chance at finding a match, but a lower precision of locating where in the image a match may occur. An output of the template matching may include match scores, which may be output as each window is sampled. In some instances, the match score may have a decimal value that ranges between 0 and 1, in which a match score of 1 represents the highest confidence in a match and a match score of 0 represents the lowest confidence in a match. Other types of match scores and/or match score ranges may be utilized.

In an operation 1106, process 1100 may include determining whether the obtained portion matches any control point location already known by the system. In the context of operation 1106, the window size may be set to be the entire size of the control point location already known by the system. Other portions of the control point location already known by the system may be used for the window size as well. Such determination may include, for example, a determination of whether the match score exceeds a predefined threshold value, which may be initially set by and updated as appropriate by a developer or the automatically by system without user intervention. For instance, if false positives or false negative matches are observed, the threshold value may be adjusted higher or lower. As such, accuracy of the system in reading different types of trading cards and/or print quality of such trading cards may be improved based on adjusting the threshold value.

In the context of operation 1106, a match indicates that the obtained portion is already known to the system (e.g., the trading card being added has a portion that is shared in common with at least one other trading card known to the system). As such, an obtained portion that is deemed to match an existing control point will not be added to the database.

On the other hand, in an operation 1108, responsive to a determination that a match has not been found, process 1100 may include adding the obtained portion to the database, which may include storing the obtained portion in association with (e.g., via a relational database link to) control point identification information, which may indicate a location on the trading card to which the newly added portion relates. The newly added portion may serve as a new control point. It should be noted that a given location may be associated with two or more control points. This may occur when, for example, at least two trading cards have distinct designs at the given location. For example, a first card having a top-left corner portion that is different than a second card will result in the top-left corner portion being associated with at least two control points (a first one corresponding to the first card and a second one corresponding to the second card).

In an operation 1110, process 1100 may include determining whether additional locations of the trading card should be obtained for possible control point addition. For example, the control point location specification may indicate that four (or other number) of locations of the trading card be used to generate control points. Process 1100 may be repeated for each of the locations specified by the control point location specification. For example, responsive to a determination that more locations of the trading card should be obtained for possible control point addition, process 1100 may return to operation 1102. Otherwise, process 1100 may terminate.

Having described an example of adding an image excerpt to card management database 110, examples of using image excerpts (e.g., control point templates graphical encoding templates) to position an image of a trading card in an image frame using the control point templates and to identify the trading card using the graphical encoding templates will now be described.

Generating Image Frames of Cards Using a Computer Vision Engine

Referring again to FIG. 10, in operation, a physical trading card 200 may be imaged by a user device 106 (or other device). For example, user device 106 may acquire an image stream using a camera device 1002 (or other type of imaging device), which may be onboard (e.g., integrated with) user device 106, or housed separately from the user device. Examples of user device 106 have been described previously herein. The image stream may be provided (e.g., by image extraction subsystem 132) as an input to computer vision engine 1020. In some implementations, computer vision engine 1020 may use one or more feature extraction algorithms such as, without limitation, Scale-Invariant Feature Transform ("SIFT"), Speeded Up Robust Features ("SURF"), Oriented FAST and Rotated BRIEF ("ORB"), FAST, and/or other feature extraction algorithms. One non-limiting example of a computer vision engine is one provided by the Vuforia™ library.

In some implementations, physical trading card 200 may be imaged by user device 106 at an angle, rather than in a plane that is parallel to user device 106. In these instances, a perspective skew may result. Computer vision engine 1020 may account for the perspective skew so that the image of physical trading card 200 is adjusted to reduce or eliminate such skew.

In some implementations, computer vision engine 1020 may provide as output one or more image frames (illustrated in FIG. 10 as $F_1, F_2, F_N$). Each image frame $(F_{1, 2, \ldots, N})$ may include an image of the physical trading card 200, which may be adjusted for perspective skew, at a corresponding moment in time.

In some implementations, computer vision engine 1020 may determine a boundary of an image of the physical trading card 200 within an image frame. Computer vision engine 1020 may crop the image frame such that the image of the physical trading card 200 fills the entire frame, or may provide positional indicators (e.g., pixel positions or other image positional indicators) that indicate the boundary of the image of the physical trading card 200 within the image frame.

In many instances, due to technical limitations, computer vision engine 1020 may be unable to locate the image of physical trading card 200 within an image frame with sufficient precision to enable identification of the physical trading card. These technical limitations may result from, for example, an inability to distinguish a boundary of the trading card due to imaging conditions (e.g., lighting, shadowing, contrast, clarity, etc.). As a result, computer vision engine 1020 may provide only a course (or no) estimation of the boundaries of the image of the trading card within an image frame. As such, one or more image frames provided by the computer vision engine may require further analysis to locate the image of the physical trading card within an image frame, as will be described below.

Reading Graphical Encoding Indicators to Identify Cards

In one implementation, reader engine 1030 may obtain one or more image frames $(F_{1, 2, \ldots, N})$ as output of computer vision engine 1020. The following processing operations will first be described with respect to processing a single image frame, which may be applied to multiple image frames (if so provided by computer vision engine 1020).

To identify a trading card that is imaged in an image frame, reader engine 1030 may locate an image of the trading card within the image frame, as described below with reference to FIG. 12. Once the image of the trading card is located within the image frame, reader engine 1030 may identify (e.g., locate) and read the card identification region(s) based on the image of the trading card, as described below with reference to FIG. 13. To improve the accuracy of reads, reader engine 1030 may process multiple image frames (using processing operations illustrated in FIGS. 12 and 13), as described below with reference to FIG. 14. In some implementations, reader engine 1030 may respond to inconclusive reads in various ways, and perform bias correction to account for any bias introduced by image processing.

Localization—Locating an Image of a Trading Card within an Image Frame

Figure 12:
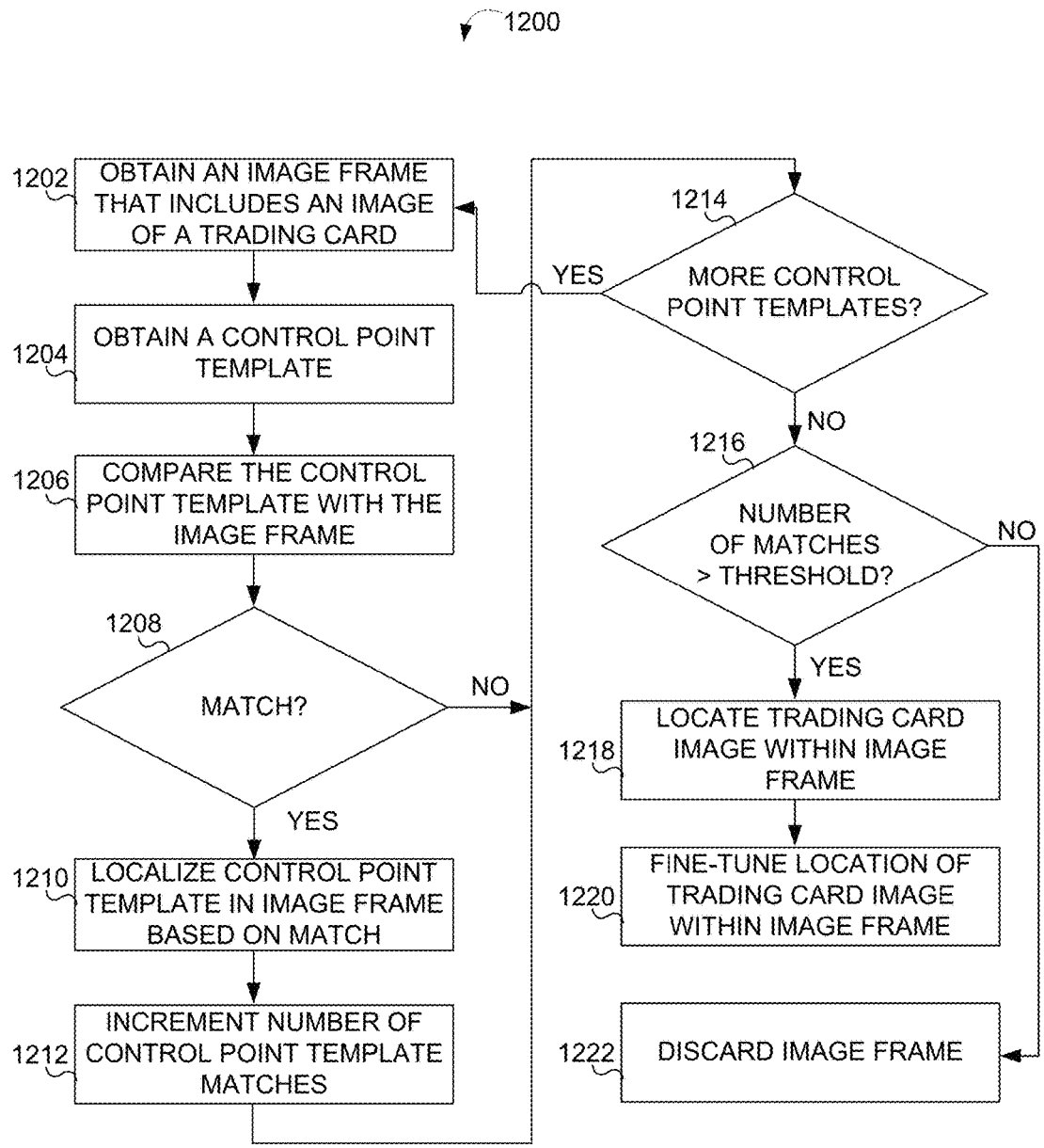
FIG. 12 is an exemplary illustration of a flowchart of a method of locating, using control point templates, an image of a trading card within an image frame, according to an implementation of the invention.

FIG. 12 is an exemplary illustration of a flowchart of a process 1200 of locating, using control point templates, an image of a trading card within an image frame, according to an implementation of the invention. As previously noted, because of technical limitations, computer vision engine 1020 may be unable to locate an image of a trading card (e.g., a boundary of the trading card) in an image frame. Process 1200 may therefore determine the location of the trading card image in the image frame. As used herein, the term "trading card image," "image of a trading card" and similar terms are each meant to convey that a physical trading card has been imaged (e.g., by an imaging device) and that such imaging is represented in an image frame, not necessarily that a discrete image of the trading card has been embedded in the image frame.

In an operation 1202, process 1200 may include obtaining an image frame (such as an image frame generated by computer vision engine 1020). The image frame may include an image of the trading card at a particular point in time.

In an operation 1204, process 1200 may include obtaining a control point template. For example, the control point template may be obtained from a database of control point templates (e.g., card management database 110) that was previously generated from excerpts of images of actual physical trading cards known to the system. As previously noted, each control point template may correspond to a particular portion of an actual physical trading card and is associated with a location on the trading card from which the control point template was derived.

In an operation 1206, process 1200 may include comparing the control point template with the image frame. Such comparison may use template matching techniques, as discussed above with respect to process 1100. In the context of operation 1206, windows of the image frame may be continuously sampled using the control point template to determine whether a match occurs. The window size and location may be set to be the expected size and location of a control point of the trading card, which may be based on the scale, orientation, angle, etc., of the image of the trading card in the image frame from the computer vision engine.

In an operation 1208, process 1200 may determine whether a match between the control point template and the image frame has been found based on the comparison. If no match has been found (e.g., a match score does not exceed a match score threshold such as 0.9), process 1200 may include skipping to operation 1214, which includes determining whether further control point templates are to be processed.

Responsive to a determination that a match has been found, in an operation 1210, process 1200 may include associating the location of the image frame at which the match occurred (e.g., based on the window size and location) with a location on the trading card to which the control point template relates. In other words, process 1200 may determine that the portion of the trading card imaged in the control point template has been found in the image frame and therefore the matching portion of the image frame contains the image of the portion of the trading card relating to the control point template.

In an operation 1212, process 1200 may include incrementing a count of the number of control point template matches.

In an operation 1214, process 1200 may include determining whether any further control point templates exist to be matched. Responsive to a determination that further control point templates exist, process 1200 may return to operation 1204, in which the next control point template is obtained. Responsive to a determination that no further control point templates exist to be matched, in an operation 1216, process 1200 may determine whether the number of control point template matches meets or exceeds a predetermined threshold number (such as, for example, three), which may be configured by a developer and/or modified based on empirical observations on the number of control point template matches that result in accurate determinations of locations of trading cards within an image frame.

Responsive to a determination that the control point template exceeds the predetermined threshold, in an operation 1218, process 1200 may include determining that the trading card may be accurately located within the image frame based on the control point template matches. Accordingly, process 1200 may determine a location of the image of the trading card within the image frame based on the control point template matches. For example, and without limitation, process 1200 may determine a boundary of the image of the trading card within the image frame based on a "top-left corner," "top-right corner," and "bottom-left corner" control point template matches (and may extrapolate any remaining boundary not covered by a control point template).

In an operation 1220, process 1200 may include fine-tuning the location of the trading card within the image frame based on further image processing, such as using an Affine Transformation.

Responsive to a determination that the control point template does not exceed the predetermined threshold, in an operation 1222, process 1200 may include determining that the image of the trading card cannot be accurately located within the image frame, and may discard the image frame (e.g., remove the image from a memory buffer used for image processing).

Identifying and Reading a Card Identification Region Based on the Localization

According to an implementation of the invention, when a location of an image of a trading card within an image frame has been determined (e.g., based on process 1200), reader engine 1030 may locate and read a card identification region to identify the trading card being imaged.

Figure 13:
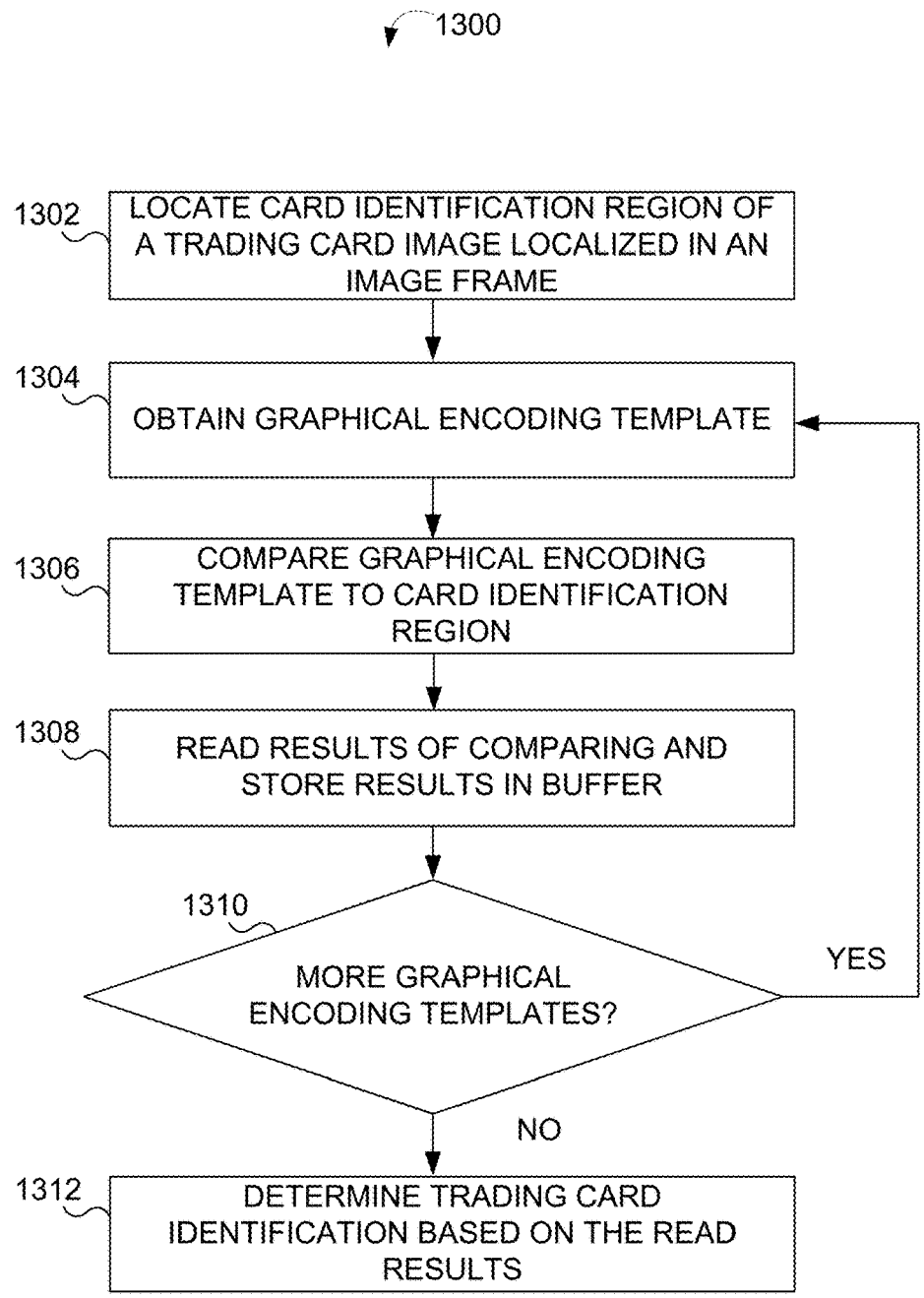
FIG. 13 is an exemplary illustration of a flowchart of a method of reading, using graphical encoding templates, a card identification region based on a location of an image of a trading card within an image frame, according to an implementation of the invention.

FIG. 13 is an exemplary illustration of a flowchart of a process 1300 of reading, using graphical encoding templates, a card identification region based on a location of an image of a trading card within an image frame, according to an implementation of the invention.

In an operation 1302, process 1300 may include locating one or more card identification regions based on the location of the image within the image frame. For example, a card identification region may be located at particular portions of a trading card. The location of card identification region may be defined based on a position indicator that indicates a location on the trading card (e.g., an identification region may be defined by a rectangle bounded by coordinates $(X_1Y_1, X_2Y_2)$, in which the X and Y coordinates are defined relative to a reference point on the trading card (e.g., the upper-left corner).

For example, and without limitation, $X_1$ may indicate a position on the trading card that is offset from the upper-left corner along an X-axis (e.g. right-to-left direction of the trading card if held in an upright position relative to the ground) of the trading card by 0.2 inches (or other value/unit of value). Likewise, $Y_1$ may indicate a position on the trading card that is offset from the upper-left corner along a Y-axis (e.g. top-to-bottom direction of the trading card if held in an upright (or other) position relative to the ground or other frame of reference) of the trading card by 0.3 inches (or other value/unit of value). $X_2$ and $Y_2$ may be similarly defined to create a bounded rectangle that defines the location of the card identification region. Other ways to represent the location of a card identification region may be used as well, including based on techniques described above with respect to process 1100.

Additionally or alternatively, the card identification region may be defined based on percentages or ratios of sizes in relation to the size of the trading card. Other ways to specify a location of a card identification region may be used as well, as would be apparent to those skilled in the art based on the disclosure herein. With knowledge of the position of the card identification region on a trading card, and knowledge of the size of an actual physical trading cards (which may be stored in card management database 110), an image of the trading card may be appropriately scaled to identify the card identification region. For example, the card identification region may exist at a position that corresponds to the left (or right or other position) ten percent of the trading card (with any percentage offsets as well).

In an implementation, the card identification region may be located within the image frame based on a coordinate transformation. For example, an offset of the card identification region (relative to a reference point on the trading card, such as a top-left corner) may be added to an offset of the top-left corner of the trading card relative to the image frame. Other coordinates relating to the card identification region may be similarly transformed to obtain the location of the card identification region within an image frame.

In an operation 1304, process 1300 may include obtaining a graphical encoding template. For example, the graphical encoding template may be obtained from a database of graphical encoding templates (e.g., card management database 110) that was previously generated based on the encoding scheme used by trading cards processed by system 100. As previously noted, each graphical encoding template may be associated with a particular value (e.g., a binary or other value) such that a match with a graphical encoding template means that a corresponding value associated the graphical encoding template has been decoded at a matching position of the card identification region.

In an operation 1306, process 1300 may include comparing the graphical encoding template and the card identification region. In particular, process 1300 may include using template matching between the graphical encoding template and the image frame at the location of the card identification region (e.g., using template matching techniques to compare the graphical encoding template to the card identification region). In the context of operation 1306, portions of the image frame may be continuously sampled along windows to determine whether a match to a graphical encoding template occurs. The size of a window may be set to be equal to the expected size of a graphical encoding indicator printed on the trading card that is imaged and the location of the windows may be based on the expected location of the card identification region in the image frame, which may be based on the scale, orientation, angle, etc., of the image of the trading card in the image frame from the computer vision engine.

For implementations in which the card identification region is located at different parts of a trading card, process 1300 may step through the different parts (e.g., the different parts corresponding to a position in the image frame). For example, and without limitation, process 1300 may match (e.g., perform template matching) along a first side of the trading card (e.g., a left side) to read a card identification region that is located along the first side of the trading card. Process 1300 may then match along a second side of the trading card (e.g., a bottom side) to read a card identification region that is located along the second side of the trading card. Process 1300 may then match along a third side of the trading card (e.g., a right side) to read a card identification region that is located along the third side of the trading card. Other sides and other portions of the trading card may be read as well.

In an operation 1308, process 1300 may include reading results of the template matching as the windows are continuously sampled. Each window may correspond to a slot, or position of a card identification region that corresponds to a graphical encoding indicator. For a given window's match score output by template matching, if the match score exceeds a predefined graphical encoding threshold value (which may be initially set to 0.9, and updated, as discussed with reference to the description of template matching from FIG. 11), then a match to the graphical encoding template may deemed to occur at a slot corresponding to the window. In this case, process 1300 may record the value and/or match score in association with the slot position in a memory buffer used for template matching. Process 1300 may increment the slot position and proceed to the next window to be matched. If the match score does not exceed the predefined graphical encoding threshold value, then process 1300 may deem the matching to be inconclusive for that particular slot for that particular value. In these instances, process 1300 may record the match score and/or an indication of inconclusiveness in association with the slot position in the memory buffer.

In an operation 1310, process 1300 may include determining whether more graphical encoding templates remain to be processed. If more graphical encoding templates remain to be processed, process 1300 may return to operation 1304. Otherwise, in an operation 1312, process 1300 may include generating a trading card identification based on the matched windows for the image frame.

Table 1 (below) illustrates exemplary results of matching graphical encoding templates with card identification regions(s) of a trading card imaged in an image frame. The results may be stored in a memory buffer associated with determining card identification information. It should be understood that the entries in Table 1 are for illustrative purposes only. Other numbers of slots may be used, which depend on the length of the trading card identification encoded by graphical encoding indicators within the card identification region(s). Furthermore, Table 1 illustrates a binary encoding scheme, although non-binary encoding schemes may be used, in which case additional columns would be used to represent such non-binary values.

TABLE 1

| Slot | Match Scores (Threshold 0.9) | | Encoded value determination |
|---|---|---|---|
| | Encoded Value (0) | Encoded Value (1) | |
| 1 | 0.95 | 0.2 | 0 |
| 2 | 0.1 | 0.91 | 1 |
| 3 | 0.7 | 0.4 | ? |
| 4 | 0.93 | 0.91 | 0 |
| 5 | 0.92 | 0.92 | ? |
| ... | ... | ... | ... |
| N | 1.0 | 0.2 | 1 |

In the example illustrated in Table 1, a number of slots (N) corresponds to an N-bit binary identification encoded by the card identification region from which the values were decoded. For example, the binary identification illustrated in Table 1 would be: 01?0? . . . 1. In some instances, a 62-bit identification (having 62 slots read) may be used, although other numbers of slots and corresponding bit count identification may be used as well.

If a match score relating to a particular graphical encoding template for a given slot exceeds a predefined graphical encoding threshold value (e.g., 0.9) and the other match scores for other values do not exceed the threshold value, then the corresponding value may be deemed to be decoded. This is illustrated for slots 1 and 2.

If no match score relating to a particular graphical encoding template for a given slot exceeds the predefined graphical encoding threshold value, then an inconclusive result (e.g., "?") for that slot will be recorded. This is illustrated for slot 3.

If a match score relating to a particular graphical encoding template for a given slot exceeds the predefined graphical encoding threshold value and the other match scores for other values also exceed the threshold value, then the corresponding value having the highest match score may be deemed to be decoded. This is illustrated for slot 4. In some alternative instances (not illustrated), however, an inconclusive result for such a slot may be recorded.

If a match score relating to a particular graphical encoding template for a given slot exceeds the predefined graphical encoding threshold value and the other match scores for other values are equal to the match score, then an inconclusive result for such a slot may be recorded. This is illustrated for slot 5.

Multi-Pass Scoring of a Card Identification Region

Figure 14:
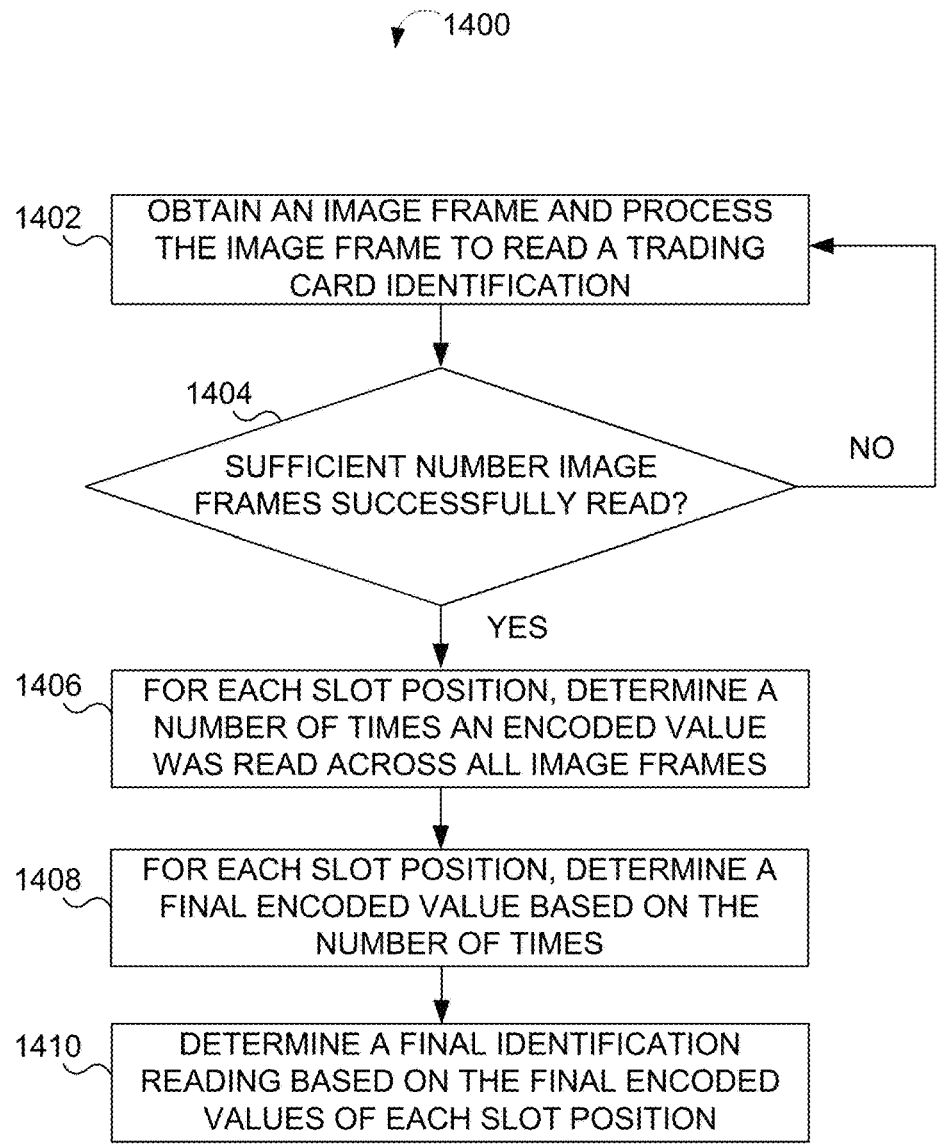
FIG. 14 is an exemplary illustration of a flowchart of a method of multi-pass scoring of decoded graphical encoding indicators, according to an implementation of the invention.

In an implementation, to improve the accuracy of reading graphical encoding indicators, multiple passes may be employed, with each pass corresponding to processing an image frame. FIG. 14 is an exemplary illustration of a flowchart of a process 1400 of multi-pass scoring of decoded graphical encoding indicators, according to an implementation of the invention.

In an operation 1402, process 1400 may include obtaining an image frame from computer vision engine 1020, and using processes 1200 and 1300 to locate an image of a trading card in the image frame and read an card identification region to decode the identification information graphically encoded therein. Process 1400 may maintain the slot and encoded value associations (as well as any corresponding match scores) in a memory buffer. If the identification information has been decoded (e.g., the image frame was not discarded during process 1200 or 1300), process 1400 may increment a count of a successful image frame read.

In an operation 1404, process 1400 may include determining whether a threshold number of image frames has been successfully read. The threshold number may be predefined (e.g., set by a developer or system). In some instances, process 1400 may dynamically adjust the threshold number with or without user intervention in order to adjust for noisy or clear imaging. If the threshold number of image frames has not been successfully read, process 1400 may include returning to operation 1402, in which a next image frame is processed.

Responsive to a determination that the threshold number of image frames has been successfully read, in an operation 1406, process 1400 may include, for each slot position, determining a number of times that a given encoded value was read across all of the image frames. For instance, as illustrated in Table 2 (below), processing of certain image frames for a given slot may result in a first encoded value having been decoded (e.g., read) for that slot, while other processing of other image frames may result in a second encoded value having been decoded for that slot.

In an operation 1408, process 1400 may include, for each slot position, determining an encoded value to be used in a final identification reading for the trading card based on the number of times that a given encoded value was read across all of the image frames. For example, if a percentage of a number of frames for which processing resulted in a first encoded value having been read exceeds a predefined percentage threshold value, the first encoded value will be used for the slot. The percentage threshold value may be set by a developer or system (and may be dynamically adjusted to account for any particularly noisy or clean imaging). In some instances, a majority rules approach may be used in which the percentage threshold value is set such that any agreement over 50% is deemed to be a correct read for a given slot. In other instances, the percentage threshold value may be set to a higher value, such as 75% to improve accuracy of reads. Other percentage threshold values may be used as well. If the percentage threshold value is not achieved, then process 1400 may determine that the reading for the slot is inconclusive.

In an operation 1410, process 1400 may include generating a final identification reading for the trading card based on the encoded values for each slot.

Table 2 (below) illustrates exemplary results for multi-pass processing, in which a final identification reading for the trading card may be determined based on agreement (or disagreement) with respect to an encoded value in each slot. The results may be stored in a memory buffer associated with determining card identification information. It should be understood that the entries in Table 2 are for illustrative purposes only. Other numbers of slots may be used, which depend on the length of the trading card identification encoded by graphical encoding indicators within the card identification region(s). Furthermore, Table 2 illustrates a binary encoding scheme, although non-binary encoding schemes may be used, in which case additional columns would be used to represent such non-binary values.

TABLE 2

| Slot | Encoded Value Determination per Frame (Min 75% agreement) | | | | Final Identification Reading |
|---|---|---|---|---|---|
| | Pass 1 ($F_1$) | Pass 2 ($F_2$) | Pass 3 ($F_3$) | Pass N ($F_N$) | |
| 1 | 0 | 0 | 0 | 0 | 0 |
| 2 | 1 | 1 | 1 | 1 | 1 |
| 3 | ? | 1 | 0 | 1 | ? |
| 4 | 0 | 0 | 1 | 0 | 0 |
| 5 | ? | 1 | 0 | 1 | ? |
| ... | ... | ... | ... | ... | ... |
| N | 1 | 1 | 1 | 1 | 1 |

As illustrated in Table 2, multiple passes of reading a card identification region of a trading card may be used to determine a final identification reading. Each pass (e.g., pass 1, pass 2, etc.) may correspond to processing a corresponding image frame ($F_1$, $F_2$, etc.) to determine an encoded value for a given slot. Assuming that a minimum of 75% agreement across all frames is used to deem that a given slot was properly read, slots 1, 2, and N may be determined to be correctly read because image frame processing (e.g., processes 1200 and 1300 for a given image frame) all agreed on the encoded value. Slot 4 may be determined to be correctly read because 75% of image frame processing agreed on the encoded value. However, slots 3 and 5 may be determined to be inconclusive because less than 75% of the image frame processing agreed on the encoded value.

Inconclusive Reads

In some implementations, to account for inconclusive reads, reading engine 1030 may produce an error message indicating that a misread occurred. In these implementations, the user may be prompted to try imaging the trading card at a different location (e.g., with better or otherwise different lighting) or using a different perspective.

Additionally or alternatively, in some implementations, to account for inconclusive reads, reader engine 1030 may repeat one or more of the processing operations illustrated in FIGS. 12-14. For instance, reader engine 1030 may attempt further image frame processing to achieve agreement for a given slot position across different image frames. In some of these instances, a hard stop value may be employed in which reader engine 1030 discontinues to attempt additional image frame processing once the number of image frames that have been processed meets or exceeds the hard stop value. This may reduce instances of "zombie" processing in which image processing may continue indefinitely even though a clear read at present lighting or other conditions may not be possible.

Bias Correction

In some implementations, template matching may introduce certain biases when matching a graphical encoding template against a window of an image frame (where the window includes an expected location of a card identification region of a trading card imaged in the image frame). For example, template matching may be biased toward certain encoded values being read over others. In a particular example, through empirical data, it may be observed that template matching tends to read an "off" value more times than an actual "off" value should have been read. This may result because certain graphical encoding indicators may be printed (or designed) in a manner that computer image processing systems (such as template matching) misrecognize such graphical encoding indicators. In another example, it may be observed that template matching tends to read an "off" value less times than an actual "off" value should have been read.

In some implementations, reader engine 1030 may account for these biases by using a bias correction parameter that adjusts a match score upward or downward, depending on whether the bias is negative or positive, respectively. The bias correction parameter may be determined based on the level in which a given encoded value has been misread (e.g., under-decoded or over-decoded). For example, and without limitation, if "off" reads were observed to be 20% lower than the number of actual values of "off" graphical indicators that were imaged, then reader engine 1030 may set the bias correction parameter such that the number of reads of "off" values is increased by 20%. Likewise, if "off" reads were observed to be 20% higher than the number of actual values of "off" graphical indicators that were imaged, then reader engine 1030 may set the bias correction parameter such that the number of reads of "off" values is decreased by 20%.

Reader engine 1030 may apply the bias correction parameter when generating match scores for individual slots (e.g., during processing operations illustrated in process 1300). In these instances, a bias correction parameter may be used to adjust the match score higher or lower in a manner that an overall number of "off" value reads is increased or decreased. For instance, continuing the foregoing examples, reader engine 1030 may determine that increasing match scores for the "off" value by 0.15 will increase the overall rate of "off" reads by 20% (assuming that the bias is negative for "off" values), then reader engine 1030 may increase each match score by 0.15.

Additionally or alternatively, reader engine 1030 may apply the bias correction parameter to the final identification reading using multiple passes (e.g., during processing operations illustrated in process 1400). In these instances, a bias correction parameter may be used to adjust the number of frame processing that resulted in the biased value. For instance, continuing the foregoing examples, reader engine 1030 may determine that increasing the number of image frame processing that resulted in an "off" value being read by 2 will increase the overall rate of "off" reads by 20% (assuming that the bias is negative for "off" values), then reader engine 1030 may increase the number of image frame processing that resulted in an "off" value being read by 2. Still additionally or alternatively, reader engine 1030 may determine that decreasing the threshold percentage value of image frame processing that resulted in an "off" value being read by 10% (e.g., from 75% to 65%) will increase the overall rate of "off" reads by 20% (assuming that the bias is negative for "off" values), then reader engine 1030 may decrease the threshold percentage value of image frame processing that resulted in an "off" value being read by 10%. Other methods of bias correction may be used as well, as would be apparent based on the disclosure herein.

Other implementations, uses and advantages of the invention will be apparent to those skilled in the art from consideration of the specification and practice of the invention disclosed herein. For example, though certain embodiments above relate to a system and method for creating uniquely identifiable trading cards, one of skill in the art will appreciate that the disclosed techniques can also be applied to other physical objects. The specification should be considered exemplary only, and the scope of the invention is accordingly intended to be limited only by the following claims.

What is claimed is:

1. A computer-implemented method of identifying a physical trading card that includes a card identification region comprising a plurality of graphical encoding indicators graphically integrated within a design of the physical trading card, wherein the plurality of graphical encoding indicators encode an identity of the physical trading card, the method being implemented in a computer system having one or more physical processors programmed with computer program instructions that, when executed by the one or more physical processors, cause the computer system to perform the method, the method comprising:

obtaining, by the computer system, at least a first image frame that includes an image of the physical trading card;

determining, by the computer system, a first location in the first image frame that corresponds to at least a portion of the physical trading card imaged in the first image frame;

determining, by the computer system, a second location in the first image frame that corresponds to the card identification region based on the first location;

obtaining, by the computer system, a plurality of graphical encoding templates that each include a graphical image corresponding to an encoded value;

comparing, by the computer system, each of the plurality of graphical encoding templates to the first image frame at the second location; and determining, by the computer system, an identification of the physical trading card based on the comparing.

2. The method of claim 1, wherein the identification of the trading card comprises an N-bit identification value comprising N binary values, N being an integer, and wherein the card identification region comprises N slots that each correspond to a graphical encoding indicator that graphically encodes either the first binary value or the second binary value and the plurality of graphical encoding templates comprise a first binary encoding template that includes a first graphical image representing a first binary value and a second binary encoding template that includes a second graphical image representing a second binary value.

3. The method of claim 2, wherein comparing each of the plurality of graphical encoding templates to the first image frame at the second location comprises:

comparing, by the computer system, the first binary encoding template to the first image frame at the second location along the N slots;

comparing, by the computer system, the second binary encoding template to the first image frame at the second location along the N slots; and for each slot, determining, by the computer system: (1) a first match score for the first binary encoding template based on comparing the first binary encoding template to the first image frame, (2) a second match score for the second binary encoding template based on comparing the second binary encoding template to the first image frame, and (3) the first binary value, the second binary value, or an inconclusive value for the slot based on the first match score and the second match score, wherein the identification of the physical trading card is determined based on the first binary value, the second binary value, or the inconclusive value of each of the N slots.

4. The method of claim 3, wherein comparing the first binary encoding template to the first image frame at the second location comprises:

determining, by the computer system, a window size of the first image frame with which to compare the first binary encoding template; and performing, by the computer system, template matching based on the window size.

5. The method of claim 2, further comprising:

obtaining, by the computer system, a bias correction parameter that accounts for a bias relating to a read of the first binary value or the second binary value; and applying, by the computer system, the bias correction parameter to adjust a read of the first binary value or the second binary value, wherein application of the bias correction parameter corrects the bias relating to the read of the first binary value or the second binary value.

6. The method of claim 2, further comprising:

obtaining, by the computer system, at least a second image frame that includes a second image of the physical trading card;

determining, by the computer system, a third location in the second image frame that corresponds to at least a portion of the physical trading card imaged in the second image frame;

determining, by the computer system, a fourth location in the second image frame that corresponds to the card identification region based on the third location;

comparing, by the computer system, each of the plurality of graphical encoding templates to the second image frame at the fourth location;

determining, by the computer system, a first set of N binary values based on comparing each of the plurality of graphical encoding templates to the first image frame at the second location; and determining, by the computer system, a second set of N binary values based on comparing each of the plurality of graphical encoding templates to the second image frame at the fourth location, wherein the identification of the physical trading card is based further on the first set of N binary values and the second set of N binary values.

7. The method of claim 1, wherein obtaining the first image frame comprises:

obtaining, by the computer system, an image stream of the trading card;

providing, by the computer system, the image stream as an input to a computer vision engine; and receiving, by the computer system, as an output of the computer vision engine, a plurality of frames, each frame comprising an image of the trading card that accounts for a perspective of the trading card, the plurality of frames including the first image frame.

8. The method of claim 1, wherein determining the location of the portion of the physical trading card imaged in the first image frame comprises:

obtaining, by the computer system, one or more control point templates that each include an image of a portion of a known physical trading card, wherein each control point template is associated with a corresponding location on the known physical trading card to which the image of the portion relates;

determining, by the computer system, a match between at least a first control point template and the first image frame; and determining, by the computer system, a location of at least a portion of the physical trading card imaged in the first image frame based on the match between the first control point template and the first image frame, wherein the location of the card identification region in the first image frame is based on the location of the portion of the physical trading card.

9. The method of claim 8, the method further comprising:

obtaining, by the computer system, at least a second image frame that includes a second image of the physical trading card;

determining, by the computer system, a number of matches between the one or more control point templates and the second image frame;

determining, by the computer system, that the number of matches does not exceed a predefined threshold number; and discarding, by the computer system, the second image frame responsive to the determination that the number of matches does not exceed a predefined threshold number.

10. The method of claim 8, wherein obtaining the one or more control point templates comprises obtaining, by the computer system, the one or more control point templates from a database of control point templates that includes excerpts of images of physical trading cards already added to the database, the method further comprising:

obtaining, by the computer system, an excerpt of an image of a new physical trading card not already added to the database;

comparing, by the computer system, the excerpt of the image of the new physical trading card with the excerpts of the images of the physical trading cards already added to the database;

determining, by the computer system, whether the excerpt of the image of the new physical trading card already exists in the database; and adding, by the computer system, the excerpt of the image of the new physical trading card to the database responsive to a determination that the excerpt of the image of the new physical trading card does not already exist in the database.

11. A system of identifying a physical trading card that includes a card identification region comprising a plurality of graphical encoding indicators graphically integrated within a design of the physical trading card, wherein the plurality of graphical encoding indicators encode an identity of the physical trading card, the system comprising:

a computer system comprising one or more physical processors programmed by computer program instructions that, when executed, cause the computer system to:

obtain at least a first image frame that includes an image of the physical trading card;

determine a first location in the first image frame that corresponds to at least a portion of the physical trading card imaged in the first image frame;

determine a second location in the first image frame that corresponds to the card identification region based on the first location;

obtain a plurality of graphical encoding templates that each include a graphical image corresponding to an encoded value;

compare each of the plurality of graphical encoding templates to the first image frame at the second location; and determine an identification of the physical trading card based on the comparing.

12. The system of claim 11, wherein the identification of the trading card comprises an N-bit identification value comprising N binary values, N being an integer, and wherein the card identification region comprises N slots that each correspond to a graphical encoding indicator that graphically encodes either the first binary value or the second binary value and the plurality of graphical encoding templates comprise a first binary encoding template that includes a first graphical image representing a first binary value and a second binary encoding template that includes a second graphical image representing a second binary value.

13. The system of claim 12, wherein to compare each of the plurality of graphical encoding templates to the first image frame at the second location, the computer system is caused to:
    compare the first binary encoding template to the first image frame at the second location along the N slots;
    compare the second binary encoding template to the first image frame at the second location along the N slots; and
    for each slot, determine: (1) a first match score for the first binary encoding template based on comparing the first binary encoding template to the first image frame, (2) a second match score for the second binary encoding template based on comparing the second binary encoding template to the first image frame, and (3) the first binary value, the second binary value, or an inconclusive value for the slot based on the first match score and the second match score, wherein the identification of the physical trading card is determined based on the first binary value, the second binary value, or the inconclusive value of each of the N slots.

14. The system of claim 13, wherein to compare the first binary encoding template to the first image frame at the second location, the computer system is caused to:
    determine a window size of the first image frame with which to compare the first binary encoding template; and
    perform template matching based on the window size.

15. The system of claim 13, wherein the computer system is further caused to:
    obtain a bias correction parameter that accounts for a bias relating to a read of the first binary value or the second binary value; and
    apply the bias correction parameter to adjust a read of the first binary value or the second binary value, wherein application of the bias correction parameter corrects the bias relating to the read of the first binary value or the second binary value.

16. The system of claim 12, the method further comprising:
    obtain at least a second image frame that includes a second image of the physical trading card;
    determine a third location in the second image frame that corresponds to at least a portion of the physical trading card imaged in the second image frame;
    determine a fourth location in the second image frame that corresponds to the card identification region based on the third location;
    compare each of the plurality of graphical encoding templates to the second image frame at the fourth location;
    determine a first set of N binary values based on comparing each of the plurality of graphical encoding templates to the first image frame at the second location; and
    determine a second set of N binary values based on comparing each of the plurality of graphical encoding templates to the second image frame at the fourth location, wherein the identification of the physical trading card is based further on the first set of N binary values and the second set of N binary values.

17. The system of claim 11, wherein to obtain the first image frame, the computer system is caused to:
    obtain an image stream of the trading card;
    provide the image stream as an input to a computer vision engine; and
    receive, as an output of the computer vision engine, a plurality of frames, each frame comprising an image of the trading card that accounts for a perspective of the trading card, the plurality of frames including the first image frame.

18. The system of claim 11, wherein to determine the location of the portion of the physical trading card imaged in the first image frame, the computer system is caused to:
    obtain one or more control point templates that each include an image of a portion of a known physical trading card, wherein each control point template is associated with a corresponding location on the known physical trading card to which the image of the portion relates;
    determine a match between at least a first control point template and the first image frame; and
    determine a location of at least a portion of the physical trading card imaged in the first image frame based on the match between the first control point template and the first image frame, wherein the location of the card identification region in the first image frame is based on the location of the portion of the physical trading card.

19. The system of claim 18, wherein the computer system is further caused to:
    obtain at least a second image frame that includes a second image of the physical trading card;
    determine a number of matches between the one or more control point templates and the second image frame;
    determine that the number of matches does not exceed a predefined threshold number; and
    discard the second image frame responsive to the determination that the number of matches does not exceed a predefined threshold number.

20. The system of claim 18, wherein to obtain the one or more control point templates, the computer system is caused to obtain the one or more control point templates from a database of control point templates that includes excerpts of images of physical trading cards already added to the database, and wherein the computer system is further caused to:
    obtain an excerpt of an image of a new physical trading card not already added to the database;
    compare the excerpt of the image of the new physical trading card with the excerpts of the images of the physical trading cards already added to the database;
    determine whether the excerpt of the image of the new physical trading card already exists in the database; and
    add the excerpt of the image of the new physical trading card to the database responsive to a determination that the excerpt of the image of the new physical trading card does not already exist in the database.

21. A computer program product for identifying a physical trading card that includes a card identification region comprising a plurality of graphical encoding indicators graphically integrated within a design of the physical trading card, wherein the plurality of graphical encoding indicators encode an identity of the trading card, the computer program product comprising:
    one or more tangible, non-transitory computer-readable storage devices;

program instructions, stored on at least one of the one or more tangible, non-transitory computer-readable tangible storage devices that, when executed, cause a computer system to:
   obtain at least a first image frame that includes an image of the physical trading card;
   determine a first location in the first image frame that corresponds to at least a portion of the physical trading card imaged in the first image frame;
   determine a second location in the first image frame that corresponds to the card identification region based on the first location;
   obtain a plurality of graphical encoding templates that each include a graphical image corresponding to an encoded value;
   compare each of the plurality of graphical encoding templates to the first image frame at the second location; and
   determine an identification of the physical trading card based on the comparing.

* * * * *